(12) United States Patent
Hosokane

(10) Patent No.: US 9,734,443 B2
(45) Date of Patent: Aug. 15, 2017

(54) TWO-DIMENSIONAL CODE, TWO-DIMENSIONAL-CODE ANALYSIS SYSTEM, AND TWO-DIMENSIONAL-CODE GENERATION SYSTEM

(71) Applicant: KYODO PRINTING CO., LTD., Tokyo (JP)

(72) Inventor: Yutaka Hosokane, Tokyo (JP)

(73) Assignee: KYODO PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/332,671

(22) Filed: Oct. 24, 2016

(65) Prior Publication Data
US 2017/0039463 A1 Feb. 9, 2017

Related U.S. Application Data

(63) Continuation of application No. PCT/JP2015/061482, filed on Apr. 14, 2015.

(30) Foreign Application Priority Data

May 14, 2014 (JP) .................................. 2014-100986

(51) Int. Cl.
G06K 19/06 (2006.01)
G06K 1/12 (2006.01)

(52) U.S. Cl.
CPC ............... *G06K 19/06* (2013.01); *G06K 1/12* (2013.01); *G06K 1/121* (2013.01)

(58) Field of Classification Search
CPC ...... G06K 19/06; G06K 7/10; G06K 9/18; G06K 9/36; G06K 9/80; G06F 17/00
(Continued)

(56) References Cited

U.S. PATENT DOCUMENTS 5,550,363 A * 8/1996 Obata .................. G06K 7/1093
235/462.11
5,726,435 A 3/1998 Hara et al.
(Continued)

FOREIGN PATENT DOCUMENTS

JP H07-254037 A 10/1995
JP 2013-238943 A 11/2013
(Continued)

OTHER PUBLICATIONS

International Search Report issued for corresponding International Patent Application No. PCT/JP2015/061482, mailed on Jun. 2, 2015.
(Continued)

*Primary Examiner* — Edwyn Labaze
(74) *Attorney, Agent, or Firm* — Myers Wolin, LLC

(57) ABSTRACT

In this two-dimensional code, data expressed in binary code is divided into cells, and arranged as a two-dimensional matrix-like pattern. The two-dimensional code is characterized by being provided with a basic pattern section, and a peripheral section arranged outside the basic pattern section. The two-dimensional code is further characterized in that the basic pattern section includes: position detection patterns for specifying cell positions; and basic-pattern-section movement information indicating the position of the basic pattern section in the two-dimensional code area.

7 Claims, 28 Drawing Sheets

(58) Field of Classification Search
USPC .................. 235/487, 375, 462.09, 462.1
See application file for complete search history.

(56) References Cited

U.S. PATENT DOCUMENTS

| | | | | |
|---|---|---|---|---|
| 6,081,627 | A * | 6/2000 | Kannon | G06K 7/1093 |
| | | | | 235/494 |
| 6,104,833 | A * | 8/2000 | Naoi | G06K 9/6807 |
| | | | | 382/177 |
| 2005/0194445 | A1* | 9/2005 | Takakura | G06K 7/10544 |
| | | | | 235/462.1 |
| 2009/0242649 | A1* | 10/2009 | Mizukoshi | G06K 19/06037 |
| | | | | 235/494 |
| 2011/0085732 | A1 | 4/2011 | Cheng | |
| 2012/0145779 | A1* | 6/2012 | Bietenbeck | G06K 19/06037 |
| | | | | 235/375 |

FOREIGN PATENT DOCUMENTS

| | | |
|---|---|---|
| JP | 2014-26643 A | 2/2014 |
| JP | 2014-71722 A | 4/2014 |
| TW | 456110 B | 9/2001 |
| TW | 201113815 A1 | 4/2011 |

OTHER PUBLICATIONS

QR code—Wikipedia, the free encyclopedia, [online] (URL: http://en.wikipedia.org/wiki/QR_Code) [Retrieved: Nov. 29, 2016] (May 12, 2014).

Andy Ramsden, "The level of student engagement with QR Codes: findings from a cross institutional survey", Working Paper, University of Bath, U.K. (Jul. 2010).

Yong-Won Jung, "A Study of types of QR codes' and their effects on advertising", Archives of Design Research vol. 26 No. 1, pp. 147-165 (Feb. 2013), with partial English translation.

* cited by examiner

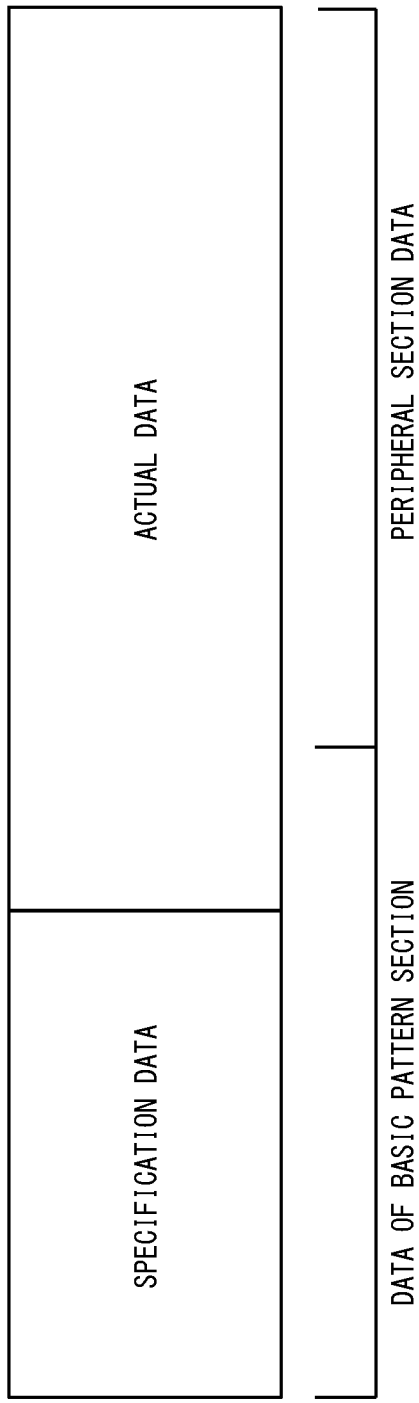

FIG. 2B

| SEGMENT | | SEGMENT | | SEGMENT | |
|---|---|---|---|---|---|
| MESSAGE HEADER (END FLAG: FALSE · MESSAGE LENGTH · MESSAGE ENCODE METHOD) | MESSAGE | MESSAGE HEADER (END FLAG: FALSE · MESSAGE LENGTH · MESSAGE ENCODE METHOD) | MESSAGE | MESSAGE HEADER (END FLAG: TRUE) | PADDING |

ACTUAL DATA

FIG. 10

| VERSION | NUMBER OF BITS | BIT SEQUENCE |
|---|---|---|
| 1 | 2 | 00 |
| 2 | 2 | 01 |
| 3 | 2 | 10 |
| 4 | 5 | 11000 |
| 5 | 5 | 11001 |
| 6 | 5 | 11010 |
| 7 | 5 | 11011 |
| 8 | 5 | 11100 |
| 9 | 5 | 11101 |
| 10 | 5 | 11110 |
| 11 | 9 | 111110000 |
| 12 | 9 | 111110001 |
| 13 | 9 | 111110010 |
| 14 | 9 | 111110011 |
| 15 | 9 | 111110100 |
| 16 | 9 | 111110101 |
| 17 | 9 | 111110110 |
| 18 | 9 | 111110111 |
| 19 | 9 | 111111000 |
| 20 | 9 | 111111001 |
| 21 | 9 | 111111010 |
| 22 | 9 | 111111011 |
| 23 | 9 | 111111100 |
| 24 | 9 | 111111101 |
| 25 | 9 | 111111110 |
| 26 | 9 | 111111111 |

TWO-DIMENSIONAL CODE, TWO-DIMENSIONAL-CODE ANALYSIS SYSTEM, AND TWO-DIMENSIONAL-CODE GENERATION SYSTEM

This application is a continuation of International Application PCT/JP2015/061482, filed on Apr. 14, 2015, which claims foreign priority to Japanese Patent Application No. 2014-100986, filed on May 14, 2014, the entire contents of which are hereby incorporated by reference.

TECHNICAL FIELD

The present invention relates to a two-dimensional code, a two-dimensional code analysis system, and a two-dimensional code generation system.

BACKGROUND ART

As compared to one-dimensional codes, two-dimensional codes are capable of storing more information in a smaller area and have superior data efficiency; therefore, two-dimensional codes are widely utilized in a variety of applications, such as inventory management and Web derivatives using mobile phones.

A two-dimensional code comprises position detection patterns of a prescribed form for detection of the positional relationship of its photographed image. In such a two-dimensional code, the position detection patterns each have a form that can be easily distinguished from other parts. When a two-dimensional code is analyzed, on its photographed image, the position detection patterns are detected and conversion is carried out based on their positional relationships. Detection of the position detection patterns is a fundamental process of the analysis and, since the code cannot be recognized without the detection of the position detection patterns, it is a critical element for the accuracy of the code analysis to configure the position detection patterns in an easily recognizable manner.

As a conventional two-dimensional code, the two-dimensional code disclosed in Patent Literature 1 is known.

CITATIONS LIST

Patent Literature

[Patent Literature 1] Japanese Unexamined Patent Publication (Kokai) No. H7-254037

SUMMARY OF INVENTION

Technical Problem

For the recognition of a two-dimensional code, it is preferable that the two-dimensional code be serviceable even in a condition where recognition thereof is difficult. For example, when the code is printed on a curled portion inside a double-spread page of a magazine, an excessively large curvature makes the position detection patterns unrecognizable. Similarly, at production sites, there are cases where a prescribed position of the code is illuminated by lighting and halation of a particular position detection pattern occurs, making the code unrecognizable. In this manner, there are cases where a code is known in advance to have a hardly readable region at a specific spot. In such cases, it is preferred to improve the accuracy of recognizing the two-dimensional code.

An object of the present invention is to realize a two-dimensional code in which the degree of freedom in the arrangement of position detection patterns is improved and the position detection patterns can thus be arranged avoiding a region that is difficult to read.

Solution to Problem

The invention of claim 1 is a two-dimensional code comprising cells representing binary-coded data that are arranged as a pattern in the form of a two-dimensional matrix, wherein the two-dimensional code comprises: a basic pattern section; and a peripheral section arranged outside the basic pattern section, and the basic pattern section comprises: position detection patterns for specifying cell positions; and basic pattern section displacement information that indicates a position of the basic pattern section in the two-dimensional code region.

The invention of claim 2 is the two-dimensional code according to claim 1, wherein the basic pattern section displacement information is basic pattern section displacement amount information that indicates the amount of displacement of the basic pattern section from a prescribed position.

The invention of claim 3 is the two-dimensional code according to claim 1, wherein the basic pattern section displacement information is basic pattern section position information that indicates the position of the basic pattern section in the two-dimensional code.

The invention of claim 4 is the two-dimensional code according to any one of claims 1 to 3, wherein the basic pattern section displacement information comprises a basic pattern section displacement flag that indicates the presence or absence of displacement of the basic pattern section from a prescribed position.

The invention of claim 5 is a system for analyzing the two-dimensional code according to claim 1, the system comprising: a detection means for determining the coordinates of the basic pattern section based on the positional relationship of the position detection patterns and detecting the basic pattern section displacement information; and an actual data analysis means for analyzing actual data composed of encoded messages, wherein the actual data analysis means detects the actual data determined based on the result of detecting the basic pattern section displacement information.

The invention of claim 6 is a system for generating the two-dimensional code according to claim 1, the system comprising: a means for generating specification data for determination of the cell arrangement in the peripheral section of the two-dimensional code; a means for generating actual data composed of encoded messages; a means for arranging the basic pattern section displacement information; and a means for arranging the actual data at least in the peripheral section.

Advantageous Effects of Invention

The two-dimensional code of the present invention has a high degree of freedom in the arrangement of its position detection patterns and, when the two-dimensional code is arranged, the position detection patterns can be positioned avoiding such a region where the position detection patterns are difficult to read. By this, the recognition accuracy in reading the two-dimensional code can be improved.

BRIEF DESCRIPTION OF DRAWINGS

FIG. 2A illustrates an example of the structure of the data recorded in the two-dimensional code;

FIG. 2B illustrates an example of the structure of the actual data recorded in the two-dimensional code;

FIG. 10 illustrates the version information, showing the versions along with the number of bits and the bit sequence that express each version;

DESCRIPTION OF EMBODIMENTS

Figure 1:
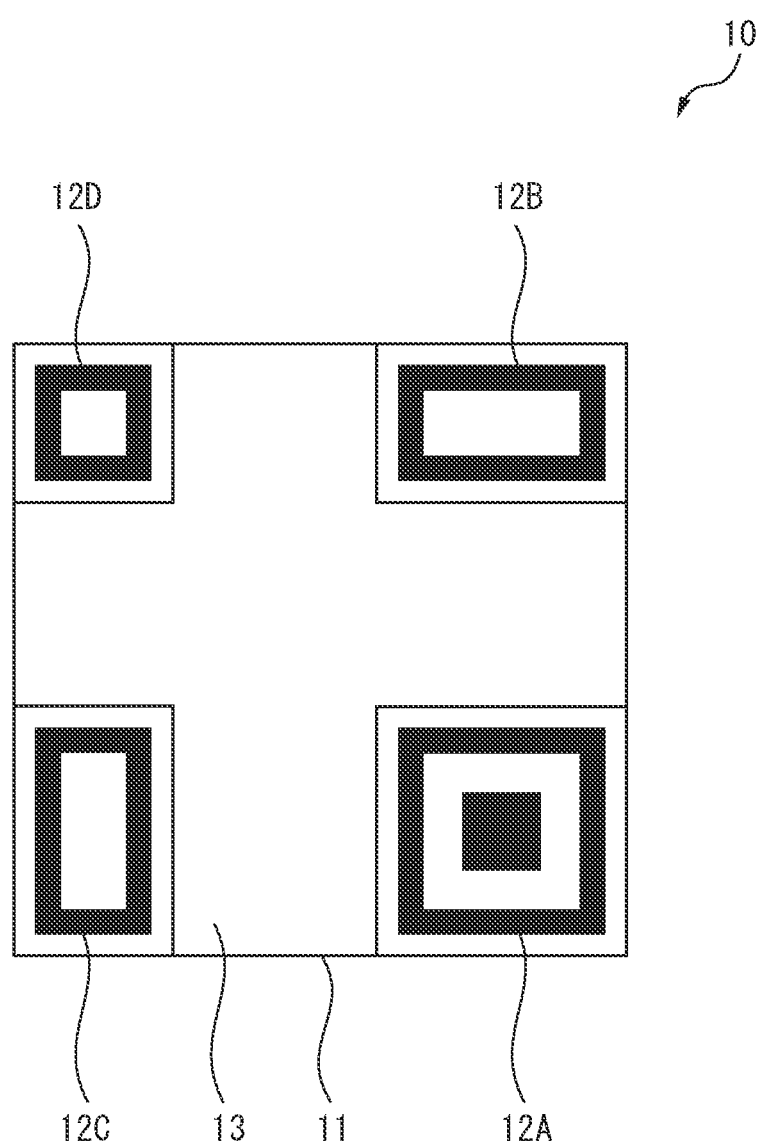
FIG. 1 illustrates the configuration of the two-dimensional code according to the first embodiment.

FIG. 1 illustrates the configuration of the two-dimensional code according to the first embodiment.

A two-dimensional code 10 of the first embodiment is a two-dimensional code comprising cells representing binary-coded data that are arranged as a pattern in the form of a two-dimensional matrix, and the two-dimensional code 10 has a basic pattern section 11 of a certain form. The basic pattern section 11 comprises: position detection patterns 12A to 12D for specifying the cell positions; and combined data composed of specification data and actual data. The specification data contain version information that determines the size of the below-described peripheral section. In the data structure representing the combined data, the specification data and the actual data are clearly separated.

In FIG. 1, the region in the basic pattern section 11 that excludes the position detection patterns 12A to 12D, i.e., the region represented by the reference number 13, is a region of the combined data. In this region 13, the combined data composed of the specification data and the actual data are recorded. In the region 13, the below-described position correction pattern and separation pattern are further arranged as required. In addition, in the region 13, basic pattern section correction data for performing error correction of the combined data are also recorded. The specification data are recorded at prescribed positions within the region 13.

The combined data are a combination of the specification data and the actual data that is recorded in the basic pattern section. The combined data do not include the actual data of the below-described peripheral section 20. The basic pattern section error correction data contain the information for correcting the prescribed data capacity represented by the region 13.

The amount of the specification data varies in accordance with the version information that determines the size of the peripheral section; the position information of the basic pattern section 11 in the two-dimensional code 10; the number of combinations of information affecting the external shape of the two-dimensional code, such as blank-related information; and the data capacity of peripheral section error correction level information. However, a change in the amount of the specification data stays within the range that can be recorded in the data region 13. The actual data are recorded in the part of the region 13 where the specification data are not recorded. In other words, since the recorded amount of the specification data contained in the combined data can be set arbitrarily, the amount of the actual data that can be recorded in the basic pattern section 11 varies depending on the amount of the specification data. In the first embodiment, it is indicated that the below-descried version information is absent in the peripheral section (version 1 (lateral)×1 (vertical)).

FIG. 2A illustrates an example of the structure of the data recorded in the two-dimensional code. FIG. 2B illustrates an example of the structure of the actual data recorded in the two-dimensional code.

As illustrated in FIG. 2A, all of the specification data are recorded in the basic pattern section 11 and the actual data are recorded in the remainder of the basic pattern section 11. The actual data that cannot be put into in the basic pattern section are recorded in the below-described peripheral section, which is formed around the basic pattern section. Since the amount of the specification data is variable, the boundary between the specification data and the actual data in the basic pattern section 11 changes in accordance with the amount of the specification data. In the basic pattern section 11, the specification data and the actual data are recorded as combined data in the form of a data bit sequence in which a binary sequence of the specification data and a binary sequence of actual data are combined. When the data region 13 in the basic pattern section 11 is divided into blocks, the boundary between the specification data and the actual data may exist inside a block.

The specification data represent information relating to the data arrangement in the peripheral section. The specification data comprises, for example: style information that selects the form of the peripheral section; vertical and lateral version information that determine the size of the peripheral section; peripheral section error correction level information if the amount of the error correction data of the peripheral section is variable; blank information that determines a block(s) in which the actual data of the peripheral section are not arranged (block information not functioning as data); and the basic pattern section displacement information.

The specification data represent the specifications of the two-dimensional code; however, when the basic pattern section 11 always has a certain form, it is regarded that the specification data substantially define the specifications of the peripheral section 20. The term "certain form" used herein means that the dimensions and the shape are fixed.

The amount of the specification data varies depending on the two-dimensional code 10 to be issued, and the specification data comprises information that affects the amount and arrangement of the data to be recorded in the peripheral section. Meanwhile, although the amount of the specification data varies, in the basic pattern section 11, the information contained in the specification data are arranged and recorded in a predetermined order. The actual data are recorded in the remainder of the data region 13 of the basic pattern section 11.

In the QR codes (registered trademark) described in Patent Literature 1 and the like, it is possible to measure the number of pixels of each position detection pattern and the number of pixels of the distance between position detection patterns from a photographed image and then calculate the version information included in the specification data.

According to the QR code (registered trademark) standard (JIS X0510: 2004), this is described as a method for determining the provisional symbol version using the reference decode algorithm. This version information is determined based on the form of the two-dimensional code in a photographed image, and an error occurs when, for example, the code is photographed from diagonally above or the image is blurred with ink. Since it is also preferred that a two-dimensional code be photographed in a severe environment and recognized even when the printing thereof is very poor, in order to inhibit the occurrence of such an error, it is desired that the two-dimensional code comprise, as data, version information along with redundancy required for reading.

FIG. 2B illustrates an example of message-encoded actual data. As illustrated in FIG. 2B, as the actual data, segments each composed of a combination of a message and a message-modifying header (message type (message encode) and message size) are arranged as many as the number of the messages. The messages are the data to be stored in a two-dimensional code by the user, and a two-dimensional code can store a plurality of messages, with a segment being imparted to each message. In addition, as a special segment, a segment which contains only an end flag without any message is prepared and, when the actual data has an unused capacity, this end-flag segment is arranged therein, followed by padding. Thus, an end flag indicates the presence or absence of a message, and the end flag of the last segment is "true" and the end flag of any other segment is "false".

The specification data and actual data illustrated in FIG. 2A are divided into block units in accordance with the data capacity per block. In the same manner, the error correction data are also divided into block units.

The data are attached with error correction data. When Reed-Solomon codes are used as the error correction data, since error correction is performed word by word, it is desired that one word constitutes one block. When one word spans over a plurality of blocks, even if only one of the blocks is contaminated, all of the words associated with the block are subjected to the error correction, which impairs the correction efficiency. Contamination and spotlight-caused color fading that lead to correction are often concentrated in one spot and, by allocating one word to one block, an effect of putting together the data to be simultaneously corrected into one spot is attained, and this enables to perform the correction efficiently and improves the probability of the code to be recognized.

The specification data will now be further described. The amount of the specification data can be increased or reduced depending on the version information that determines the size of the peripheral section. In other words, by reducing the amount of the specification data in the basic pattern section when the peripheral section is small or absent or by increasing the amount of the specification data in the basic pattern section when the peripheral section is large, the amount of the specification data can be modified in accordance with the information capacity of the code. In cases where the amount of the specification data is fixed as in conventional codes, there is also a problem that the ratio of the amount of the specification data with respect to the area of the code is large when the code has a small size; however, this problem can be solved in the present embodiment.

As described above, the specification data contain version information, and the size of the two-dimensional code is determined based on the version information. For instance, when the version information includes two kinds of data, which are lateral version information representing the lateral size of the code and vertical version information representing the vertical size of the code, the code is a rectangle of an arbitrary size. The details of the version information will be described later.

Figure 3A:
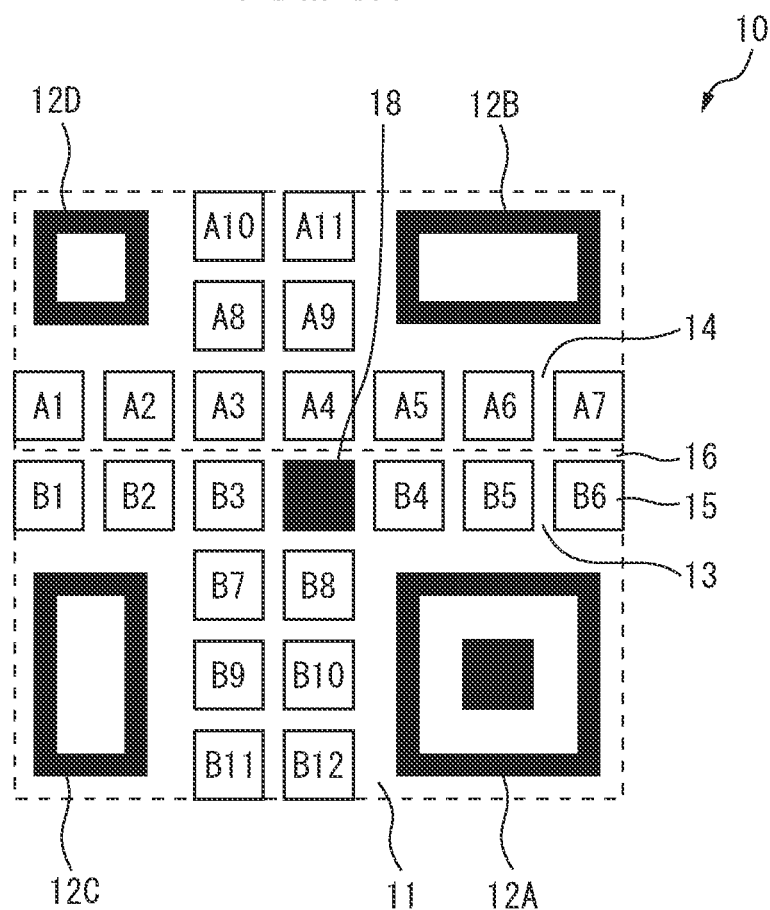
FIG. 3A illustrates an example of the overall configuration of the data arrangement in the two-dimensional code according to the first embodiment.
Figure 3B:
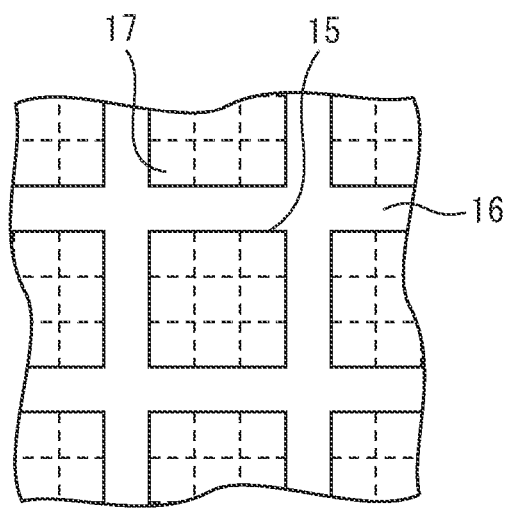
FIG. 3B illustrates an example of the data arrangement in the two-dimensional code according to the first embodiment, wherein the two-dimensional code is partially enlarged to depict blocks and separation pattern.

FIG. 3A illustrates one example of the overall configuration of the data arrangement in the two-dimensional code according to the first embodiment. FIG. 3B illustrates one example of the data arrangement in the two-dimensional code according to the first embodiment, and the two-dimensional code is partially enlarged to depict blocks and separation pattern.

In the example illustrated in FIG. 3B, the two-dimensional code 10 of the first embodiment comprises blocks each having a size of 3 lateral cells×3 vertical cells, and a separation space 16 has a width of a single cell. The basic pattern section 11 is the area enclosed by a dotted line and has a size of 7 lateral blocks×7 vertical blocks (27 lateral cells×27 vertical cells), and the position detection patterns 12A to 12D are arranged at four corners of the basic pattern section 11. The region of the basic pattern section 11 that excludes the position detection patterns 12A to 12D is the data region 13 of the basic pattern section 11. In the region 13, blocks A1 to A11 in a region 14 other than the position detection patterns 12B and 12D, which region 14 is on the upper side of the basic pattern section 11 and has a size of 7 lateral blocks×3 vertical blocks, are the blocks in which the combined data are recorded; and blocks B1 to B12 of a lower region of the basic pattern section 11 other than the position detection patterns 12A and 12C, which region has a size of 7 lateral blocks×4 vertical blocks, constitute a region 13 of the basic pattern section 11 where the basic pattern section error correction data (words) used for performing error correction of the combined data are recorded.

Each block is composed of 3 lateral cells and 3 vertical cells, and the blocks may be rectangular or have varying shapes.

In addition, although the cells are illustrated to be square, the cell shape is not restricted thereto.

Further, in the two-dimensional code 10 of FIG. 3A, since the blocks are separated from each other by the separation pattern 16, the four position detection patterns 12A to 12D all have a larger area than any of the blocks. As a result of this, a pattern that is identical to any of the position detection patterns never appears in the two-dimensional code, making the identification of the position detection patterns easy. Moreover, since the blocks 15 are separated from each other by the separation space 16, the accuracy of determining light and dark cells in each block 15 is improved particularly when the photographed image is blur and fuzzy.

In the region 13 of the two-dimensional code 10 of FIG. 3A, a block 18 is a position correction pattern. In this position correction pattern 18 (block 18), all of the 9 cells are dark; however, the form of the position correction pattern 18 is not restricted thereto, and the position correction pattern 18 may take any form as long as it can be identified as a position correction pattern.

When the coordinates of the center block of the basic pattern section is defined as "(CX, CY)", it is desired that the position correction pattern 18 be arranged in the block of (CX+7N, CY+7M) (wherein, N and M are each an integer, with a proviso that this block stays within the code). In the part outside the region of the two-dimensional code 10, no position correction block is arranged. In addition, the position correction pattern 18 is not arranged if it overlaps with a blank block or any of the position detection patterns. In FIG. 3A, the position correction pattern 18 wherein N=M=0 is arranged only in one block.

Incorporation of the position correction pattern enhances the redundancy and an improvement in the recognition accuracy can thus be expected. When one of the position detection patterns 12A to 12D is not recognized due to contamination, the position correction pattern 18 is found by estimating the position thereof from the other three position detection patterns that are recognizable. By performing two-dimensional projective transformation using a set of the four points composed of the three position detection patterns and one position correction pattern as a parameter, the accuracy of calculating each cell of the two-dimensional code 10 is improved. In this manner, in the two-dimensional code 10 of FIG. 3A, the accuracy of detecting the cell positions is further improved by arranging the position correction pattern 18.

As for the arrangement of the position detection patterns, there are other various combinations can be considered. Those combinations in which the total number of position detection patterns and position correction patterns is 5 and the number of position detection patterns is 3 or less are all recognizable, although they have lower tolerance to contamination and the like than a combination of 4 position detection patterns and a single position correction pattern.

The position detection patterns and position correction pattern(s) are used for specifying the cell coordinates; however, their roles are different. It is desired that the position detection patterns be independently recognizable in the analysis and that no pattern of the same form appear in and out of the code. When wrong position detection patterns are detected, it is necessary to judge whether or not they belong to the same two-dimensional code and the analysis thus takes time. It is also desired that the position detection patterns do not have a complex form that requires a long time for identification or such a shape that is difficult to be separated from other parts of the code.

Meanwhile, the detection of the position correction pattern is performed after the position of the two-dimensional code is specified based on the position detection patterns. With the position of the position correction pattern being roughly known, the position correction pattern is found by searching a certain area. The position correction pattern enables to improve the accuracy of calculating the cell coordinates and to thereby increase the probability of the two-dimensional code to be recognized even when the cells are not uniform due to bending of the two-dimensional code.

Figure 4:
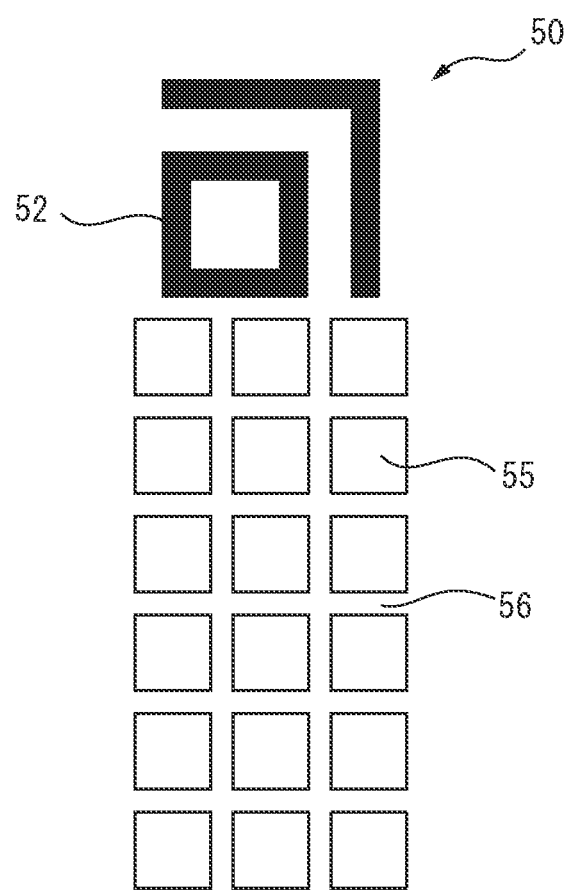
FIG. 4 illustrates a modification example of the two-dimensional code according to the first embodiment.

FIG. 4 illustrates a modification example of the two-dimensional code according to the first embodiment. In this manner, the two-dimensional code may have only one position detection pattern. When the two-dimensional code has only one position detection pattern, however, the position detection pattern is required to be one whose direction can be determined uniquely, such as position detection pattern 52 illustrated in FIG. 4.

Figure 5A:
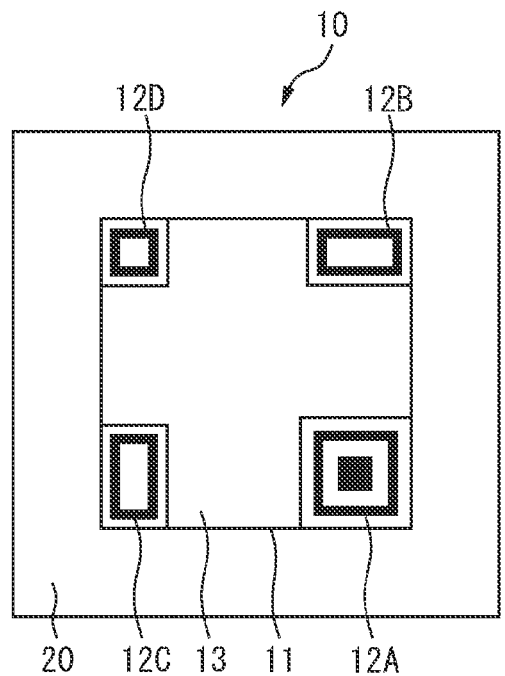
FIG. 5A is a drawing (1) that illustrates the second embodiment.
Figure 5B:
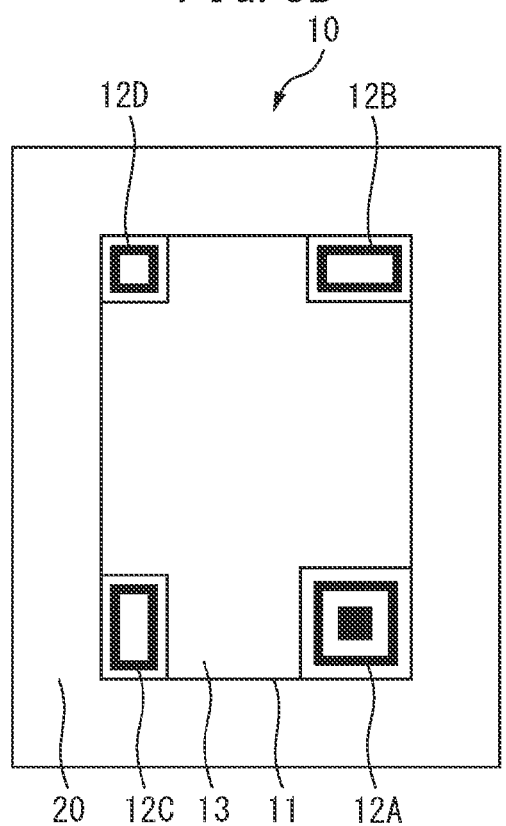
FIG. 5B is a drawing (2) that illustrates the second embodiment.
Figure 5C:
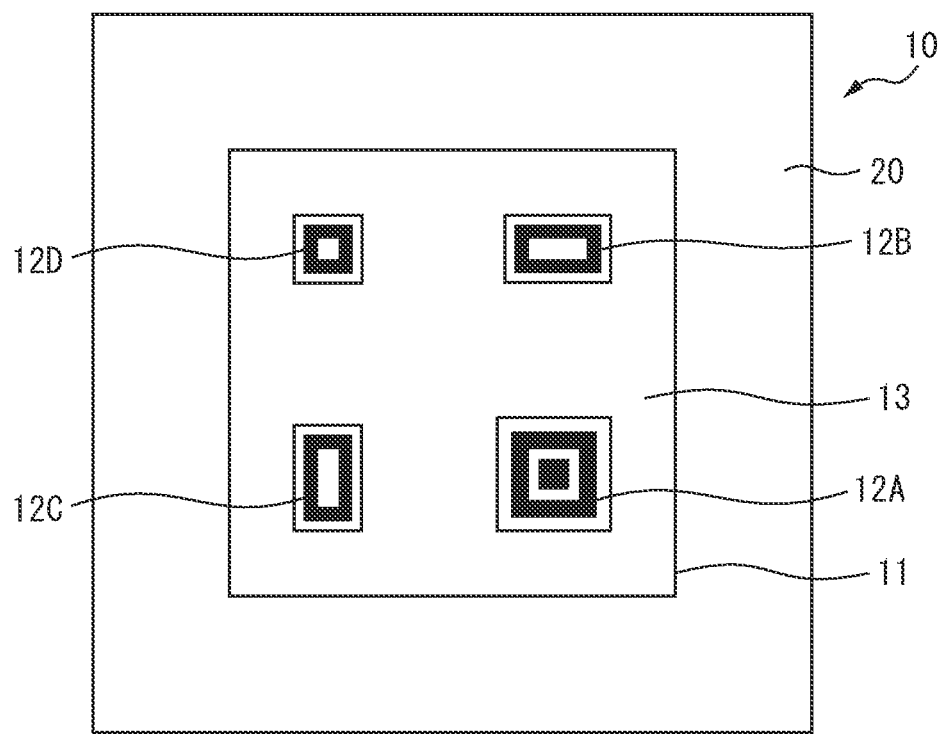
FIG. 5C is a drawing (3) that illustrates the second embodiment.

FIGS. 5A, 5B and 5C illustrate the second embodiment. The second embodiment is different from the first embodiment in that a peripheral section 20 is arranged around the basic pattern section. When all of the actual data cannot be recorded in the basic pattern section due to an increase in the specification data or actual data, the remaining actual data are recorded in the peripheral section 20.

FIG. 5A illustrates an example where a square basic pattern section 11 is used. FIG. 5B illustrates an example where, as compared to FIG. 5A, the two-dimensional code 10 further comprises a vertically-elongated basic pattern section 11 and the peripheral section 20. The shape (square or rectangular), the size and the like of the basic pattern section 11 can be arbitrarily designed.

FIG. 5C illustrates an example where, in the basic pattern section 11, the position detection patterns 12A to 12D are arranged in the interior away from the boundary of the basic pattern section 11, in other words, at non-corner positions. As illustrated in FIG. 5C, the position detection patterns 12A to 12D are not required to be arranged at the corners or along the boundary of the basic pattern section 11.

Figure 6A:
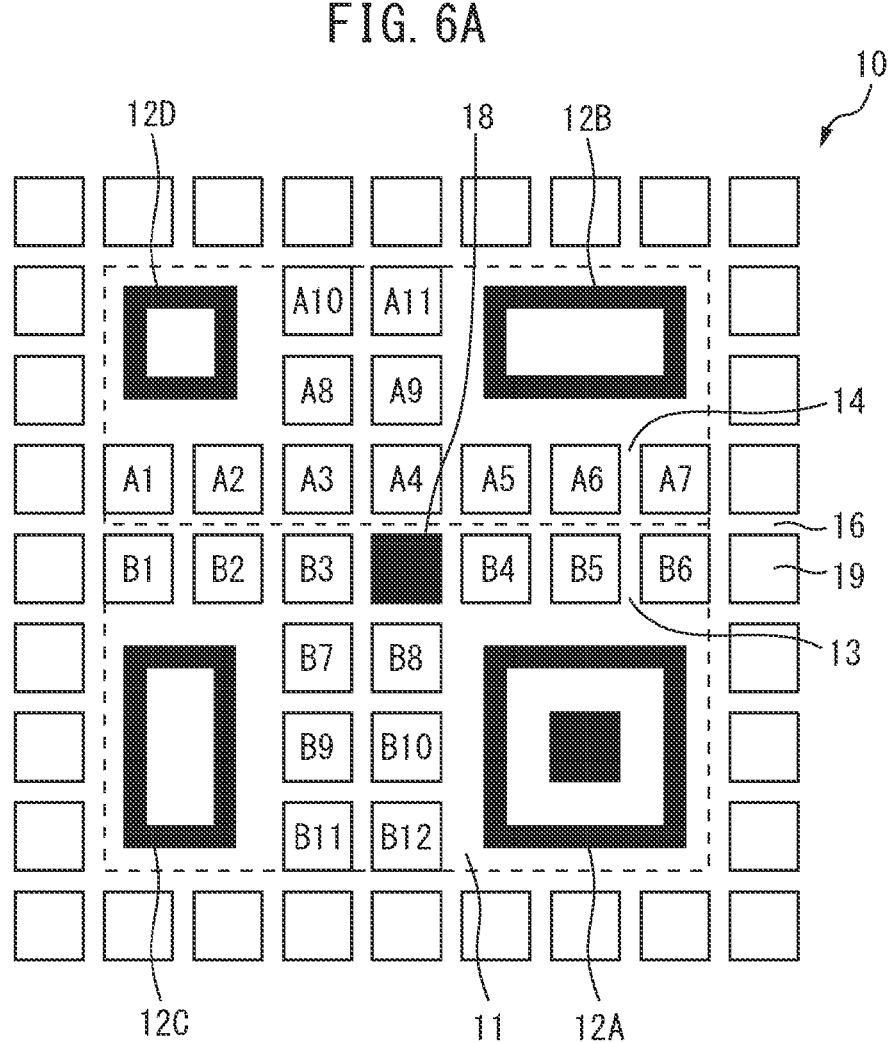
FIG. 6A is a drawing (1) that illustrates an example of the data arrangement in the two-dimensional code according to the second embodiment.
Figure 6B:
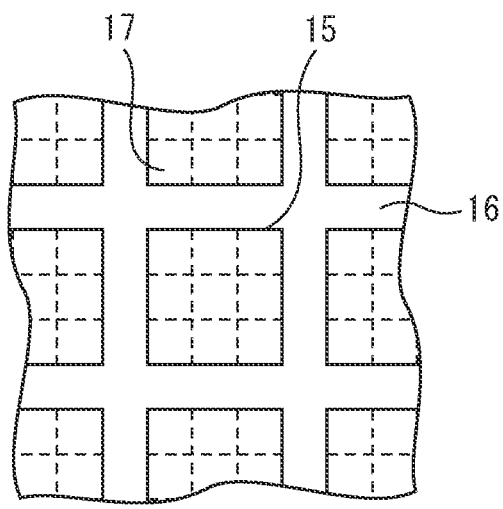
FIG. 6B is a drawing (2) that illustrates an example of the data arrangement in the two-dimensional code according to the second embodiment.
Figure 7A:
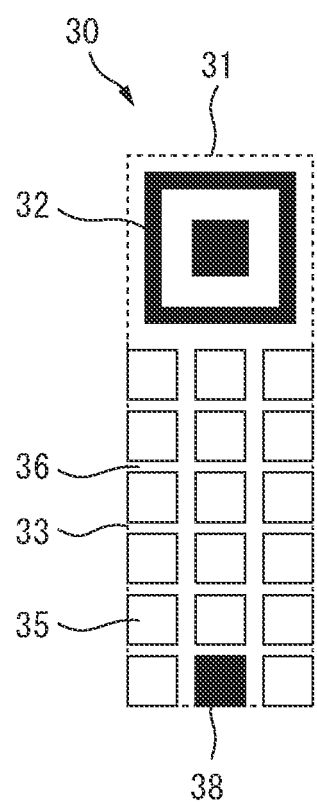
FIG. 7A is a drawing (1) that illustrates other example of the second embodiment.
Figure 7B:
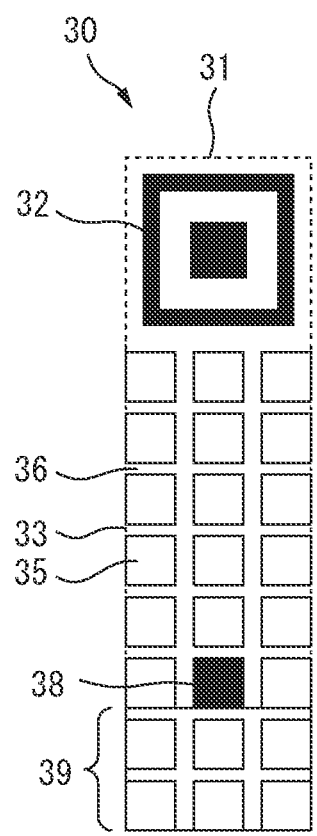
FIG. 7B is a drawing (2) that illustrates other example of the second embodiment.
Figure 7C:
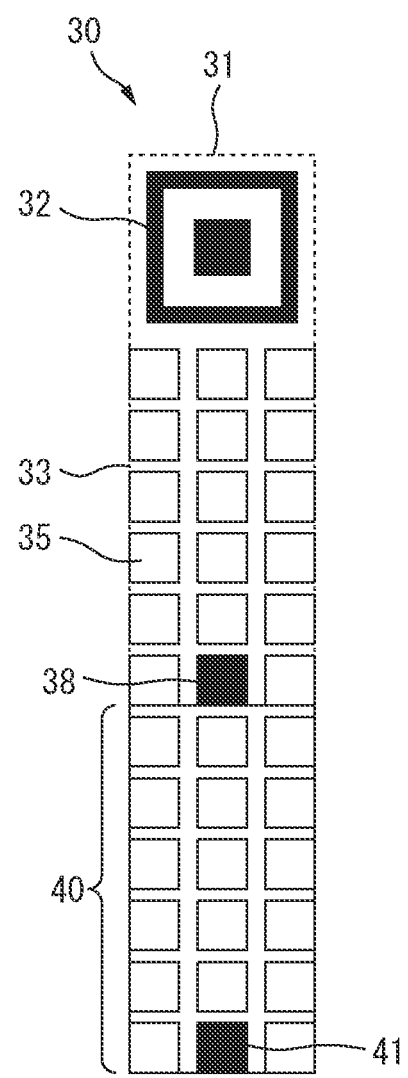
FIG. 7C is a drawing (3) that illustrates other example of the second embodiment.
Figure 7D:
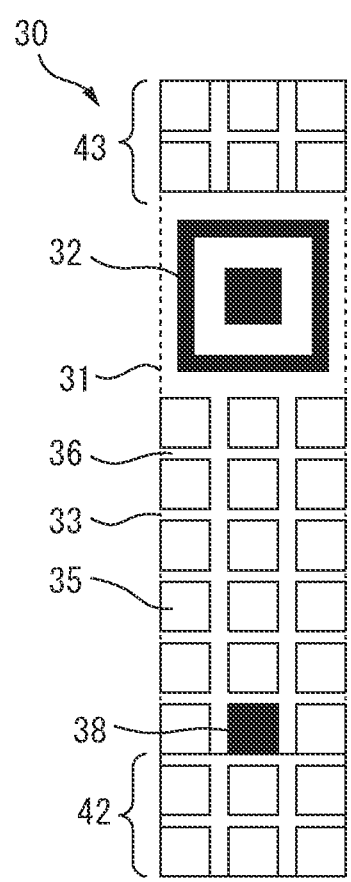
FIG. 7D is a drawing (4) that illustrates other example of the second embodiment.
Figure 8:
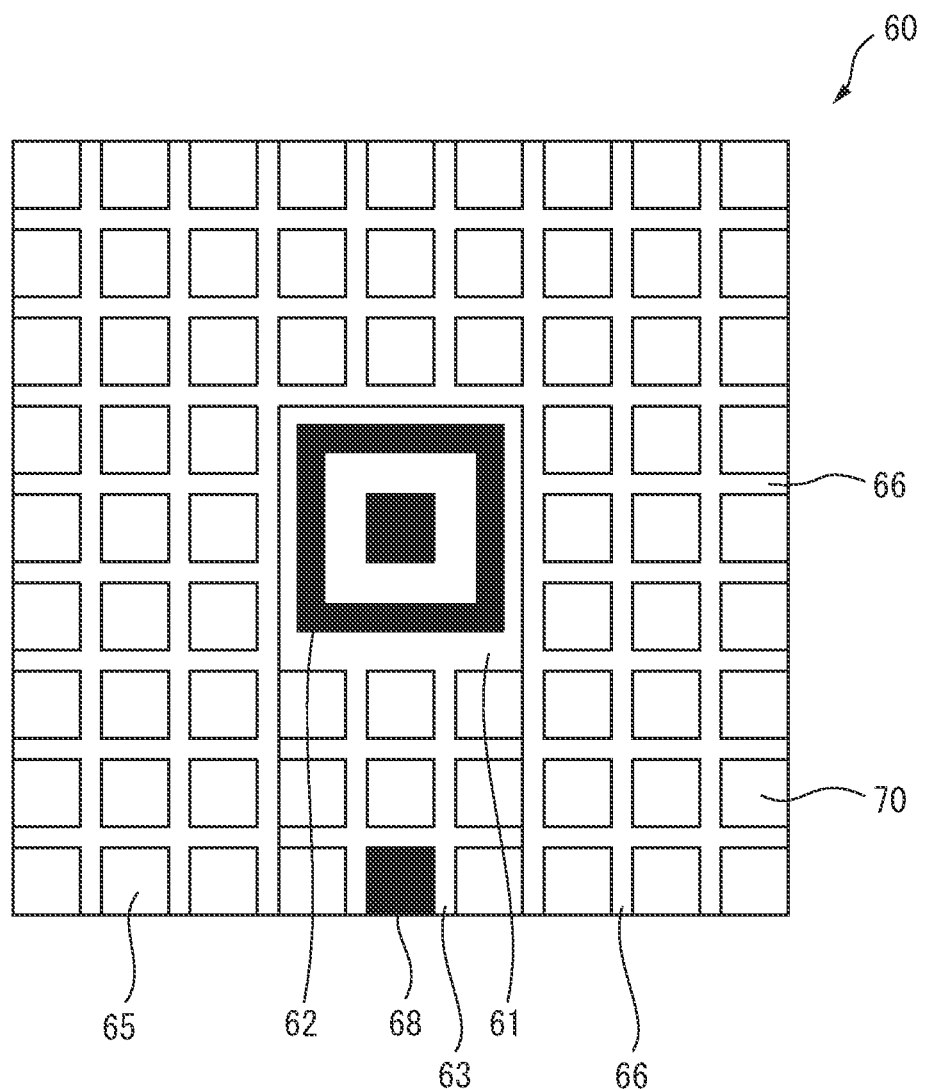
FIG. 8 is a drawing (5) that illustrates other example of the second embodiment.

FIG. 6A is a drawing (1) that illustrates one example of the data arrangement in the two-dimensional code according to the second embodiment. FIG. 6B is a drawing (2) that illustrates one example of the data arrangement in the two-dimensional code according to the second embodiment. FIG. 6A is different from FIG. 3A, which illustrates the data arrangement in the two-dimensional code according to the first embodiment, in that actual data-recording blocks 19 are arranged.

FIGS. 7A to 7D and 8 illustrate other examples of the second embodiment. As in the first embodiment, the two-dimensional code may have only one position detection pattern. Further, as in the case of FIG. 4, as long as the rotational direction of the position detection pattern can be specified uniquely, it is not indispensable to arrange the position correction pattern 38 and the like.

When the code of the second embodiment comprises plural position detection patterns, the code is advantageous for simultaneous recognition of plural two-dimensional codes. In cases where a plurality of such two-dimensional codes are recognized at once, the plural position detection patterns of the plural two-dimensional codes are projected on a single photographed image. For example, when plural (3 or more) position detection patterns are arranged at four corners of a square (rectangular) two-dimensional code, since a large number of similar position detection patterns are included in the image, it is difficult to narrow down a correct combination of the position detection patterns.

For the analysis process in this case, the analysis time is shortened by making it easy to narrow down the correct combination of the position detection patterns. As in the second embodiment, by allowing the basic pattern section to always have a fixed size even when the size of the code is changed, not only the distances between the position detection patters contained in the same two-dimensional code are fixed but also, when the two-dimensional code is of a high version number and has a large peripheral section 20, the distances between its position detection patterns and those of other two-dimensional codes are long. This enables to easily exclude those combinations of position detection patterns that have incorrect distances therebetween, so that the number of combinations to be assessed can be reduced. Although this effect is greater when the two-dimensional code is in a square form, the effect of reducing the combinations can be obtained even when the two-dimensional code is rectangular.

Figure 9A:
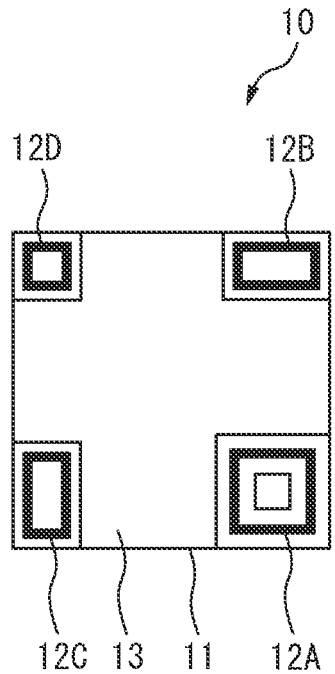
FIG. 9A is a drawing (1) that illustrates the changes in accordance with the version information of the two-dimensional code.
Figure 9B:
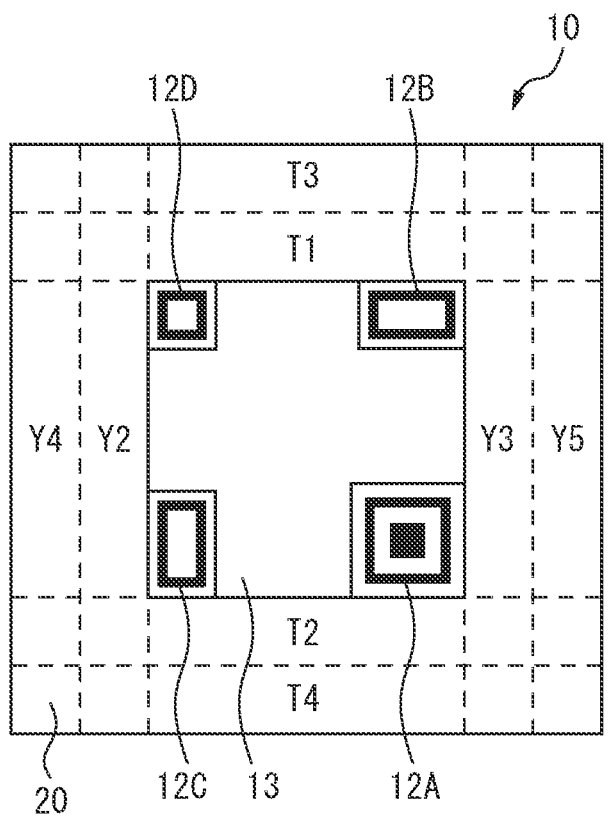
FIG. 9B is a drawing (2) that illustrates the changes in accordance with the version information of the two-dimensional code.

FIGS. 9A and 9B illustrate changes in accordance with the version information of the two-dimensional code. The two-dimensional code 10 of the first embodiment is a minimum-size code which has only the basic pattern section 11 as illustrated in FIG. 9A, and such a minimum-size square two-dimensional code having only the basic pattern section 11 is hereinafter referred to as "version 1 (lateral)×1 (vertical)".

In the two-dimensional code 10 of the second embodiment, the size of the peripheral section 20 can be expanded in each of the vertical and lateral directions. When the lateral version is 2 and the vertical version is 3, the two-dimensional code is denoted as "version 2 (lateral)×3 (vertical)". Based on the version 1 (lateral)×1 (vertical) that has the same shape as the basic pattern section, the size of the whole two-dimensional code 10 increases as the version number increases. An increase in the version by 1 corresponds to an increase in the size by a single unit. In this example, the version can be selected to be, but not limited to, 1 to 26. The use of the version information enables to design the two-dimensional code to have a variable size with the distances between the plural position detection patterns being fixed.

As illustrated in FIG. 9B, as for the increase in the lateral version, in accordance with the increase in the version number, the size of the peripheral section 20 in the lateral direction increases unit by unit alternately on each side in such a manner that one unit is added on the left side (Y2), then on the right side (Y3), then on the left side (Y4), then on the right side (Y5) and so on. In other words, when the version number increased by 1 is an even number, one unit is added on the left side. In the same manner, when the version number increased by 1 is an odd number, one unit is added on the right side. Accordingly, when the lateral version is an odd number, the width of the peripheral section 20 on the left side and that on the right side are the same, whereas when the lateral version is an even number, the left side of the peripheral section 20 is wider by one unit than the right side.

As illustrated in FIG. 9B, as for the increase in the vertical version, in accordance with the increase in the version number, the size of the peripheral section 20 in the vertical direction increases unit by unit alternately on each side in such a manner that one unit is added on the upper side (T1), then on the lower side (T2), then on the upper side (T3), then on the lower side (T4) and so on. In other words, when the version number increased by 1 is an even number, one unit is added on the upper side. In the same manner, when the version number increased by 1 is an odd number, one unit is added on the lower side. Accordingly, when the vertical version is an odd number, the width of the peripheral section 20 on the upper side and that on the lower side are the same, whereas when the vertical version is an even number, the upper side of the peripheral section 20 is wider by one unit than the lower side.

The position of this basic pattern section is defined as a prescribed position that serves as a reference in the displacement of the basic pattern section.

With regard to the change in the size of the two-dimensional code based on the change in the version, in addition to the above-described case where the size is increased unit by unit alternately, there may be a case where the size is increased alternately by two or more units at a time, a case where the size is increased unit by unit equally on each of the upper, lower, left and right sides, or a case where the size is increased only in a single direction, such as only in the upper and left direction or the lower and left direction. Further, when the version number is small, the size of the two-dimensional code may be changed unit by unit alternately on the left and light sides or on the upper and lower sides. When the version number is small large, a variety of methods, such as a method of changing the size unit by unit equally on the left and light sides or on the upper and lower sides, can be considered.

One example of the mechanism in which the amount of the specification data increases as the version becomes high will now be described.

FIG. 10 illustrates the version information, showing the versions along with the number of bits and the bit sequence that are required for expressing each version. A pair of version information having such data structure is arranged for the vertical and lateral directions.

In FIGS. 7A to 7D and the like, a rectangular two-dimensional code is used as an example; however, when the form is restricted to be a square, only a single version information of the specification data may be arranged. On the other hand, when the two-dimensional code to be made readable is allowed to handle a plurality of forms, the amount of information contained in the data representing the version information is increased, and the version information of the specification data is also increased in accordance with the number of forms that are made readable. In other words, the amount of the data contained in the version information increases in accordance with the degree of freedom in selecting the external shape of the two-dimensional code.

The two-dimensional code 10 of the second embodiment comprises, as specification information, data of the lateral version information and the vertical version information in the order mentioned. When 2 bits extracted from the top of the specification data are any one of "00", "01" and "10", the lateral version is determined to be 1 to 3 and the third and following bits constitute the vertical version information. When the first 2 bits are "11", the next 3 bits are extracted. When these 3 bits are not "111", the lateral version is determined to be 4 to 10 and the sixth and following bits constitute the vertical version information. Meanwhile, when the 3 bits are "111", the next 4 bits are extracted and the lateral version is determined to be 11 to 26, with the tenth and following bits constituting the vertical version information.

The vertical version information is also extracted in the same manner, and the bits following a bit sequence of the specification data representing the lateral and vertical information constitute the actual data. Therefore, for the version information of FIG. 10, the number of bits required for expressing each version may be employed. For instance, only two bits can be used for expressing the versions 1 to 3, and the third and following bits that are required for expressing other versions can be allocated to other data.

The first embodiment is the smallest code in which the bit sequence of the lateral version is "00" and that of the vertical version is also "00".

In this manner, by reducing the number of bits used for the version information when the two-dimensional code is small or by increasing the number of bits used for the version information when the two-dimensional code is large, the ratio of the data amount of the version information with respect to the data capacity of the two-dimensional code can be made more constant as compared to a case where the data amount of the version information is fixed. The present embodiment solves the problem that, when the code is small, the relative data amount of the specification information is increased and the data efficiency is thus poor.

Similarly, for example, when a blank region is arranged in the code, as the information relating to this region, a blank-embedding flag that indicates the presence of a blank region and blank position information that represents the blank region-related information are included into the specification data. Meanwhile, when no blank region is arranged, only a blank-embedding flag that indicates the absence of a blank region is included into the specification data and the blank region-related information is omitted, whereby the amount of information in the specification data can be reduced. Further, when a blank region is arranged, by changing the number of bits also for the blank region-related information in accordance with the version information, the information efficiency of the specification data can be improved.

An example of a two-dimensional code imparted with the degree of freedom will now be described. By imparting the degree of freedom, information for providing functionality as the specification data is added and the amount of the actual data that can be recorded in the basic pattern section is consequently reduced.

The degree of freedom is affected by two factors, which are functions and the range of change in the functions.

As a function, for example, the change in the size of the two-dimensional code is compared between a case where the two-dimensional code is square and a case where the two-dimensional code is rectangular. A square can be represented by a single parameter, namely the length of a side; however, a rectangle requires two parameters, namely the length of the long side and the length of the short side. Thus, it can be said that a square has one function while a rectangle has two functions. When the two-dimensional code is allowed to have a blank region, a function is further added.

As for the range of change in the functions, for example, in the two-dimensional codes of FIGS. 7A to 7D, the vertical version and the lateral version can be independently selected in a range of 1 to 26, so that each function has several patterns of change.

Therefore, the degree of freedom may be considered as a multiplication of the functions and the range of change in the functions. The higher this degree of freedom, the greater the number of options for the form of the two-dimensional code that a user can select, so that a single type of code can satisfy the needs of a greater number of users.

By imparting the two-dimensional code with such functionality, it becomes possible to provide a region where a design such as a character can be embedded in the two-dimensional code and thereby improve the design properties of the two-dimensional code and to modify the form of the two-dimensional code in conformity to a limited space of a folder back cover or the like.

Figure 11:
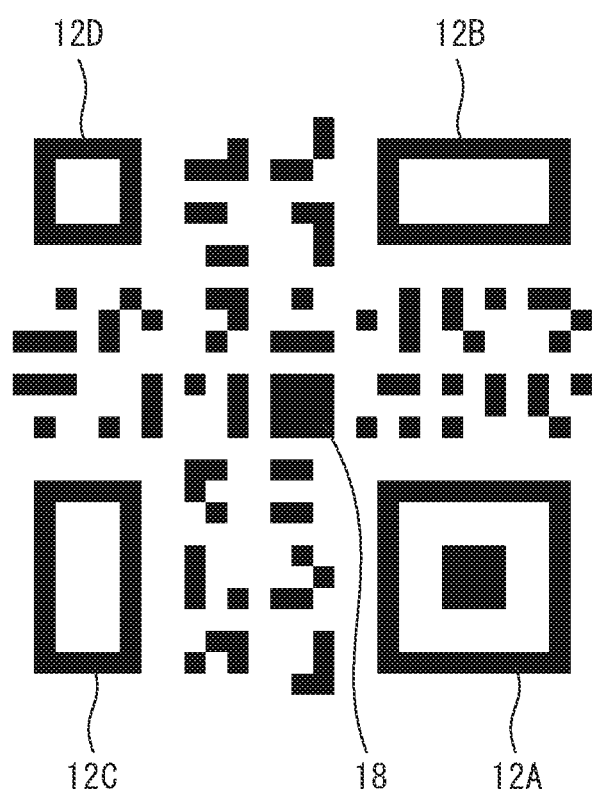
FIG. 11 illustrates an example of the two-dimensional code according to the first embodiment.

FIG. 11 illustrates an example of the two-dimensional code according to the first embodiment.

Figure 12:
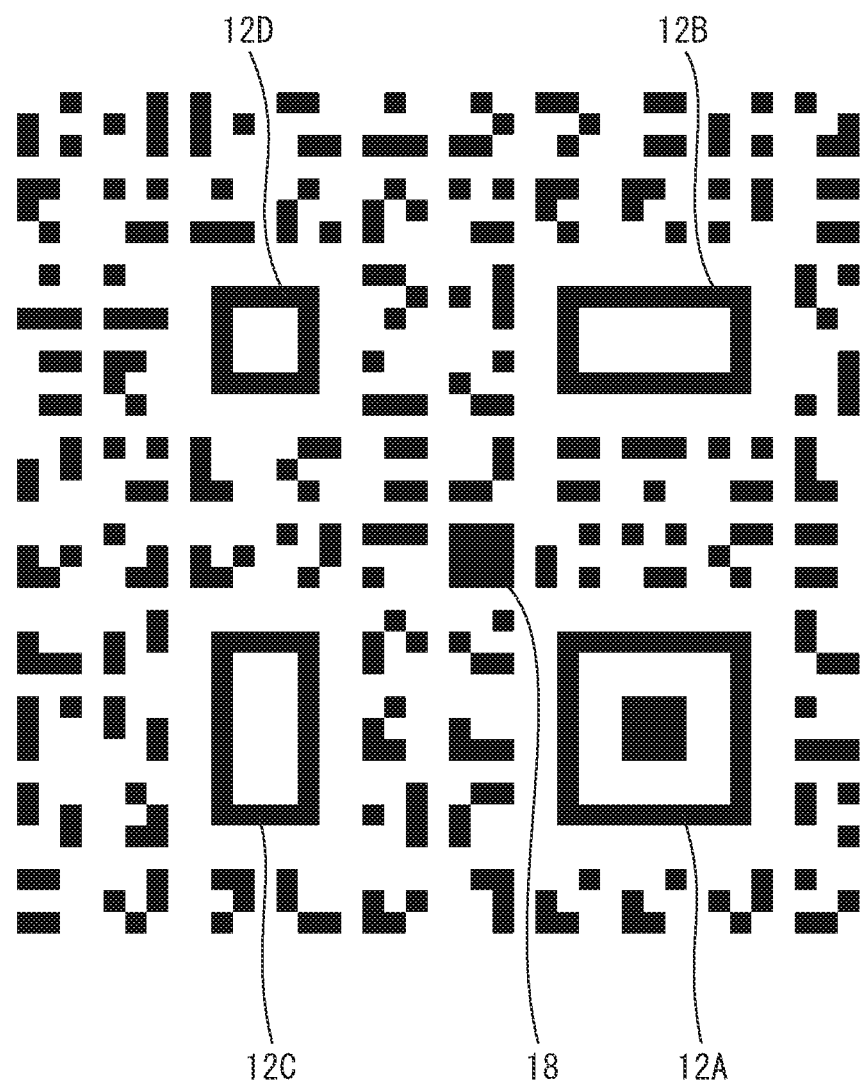
FIG. 12 illustrates an example of the second embodiment.
Figure 13:
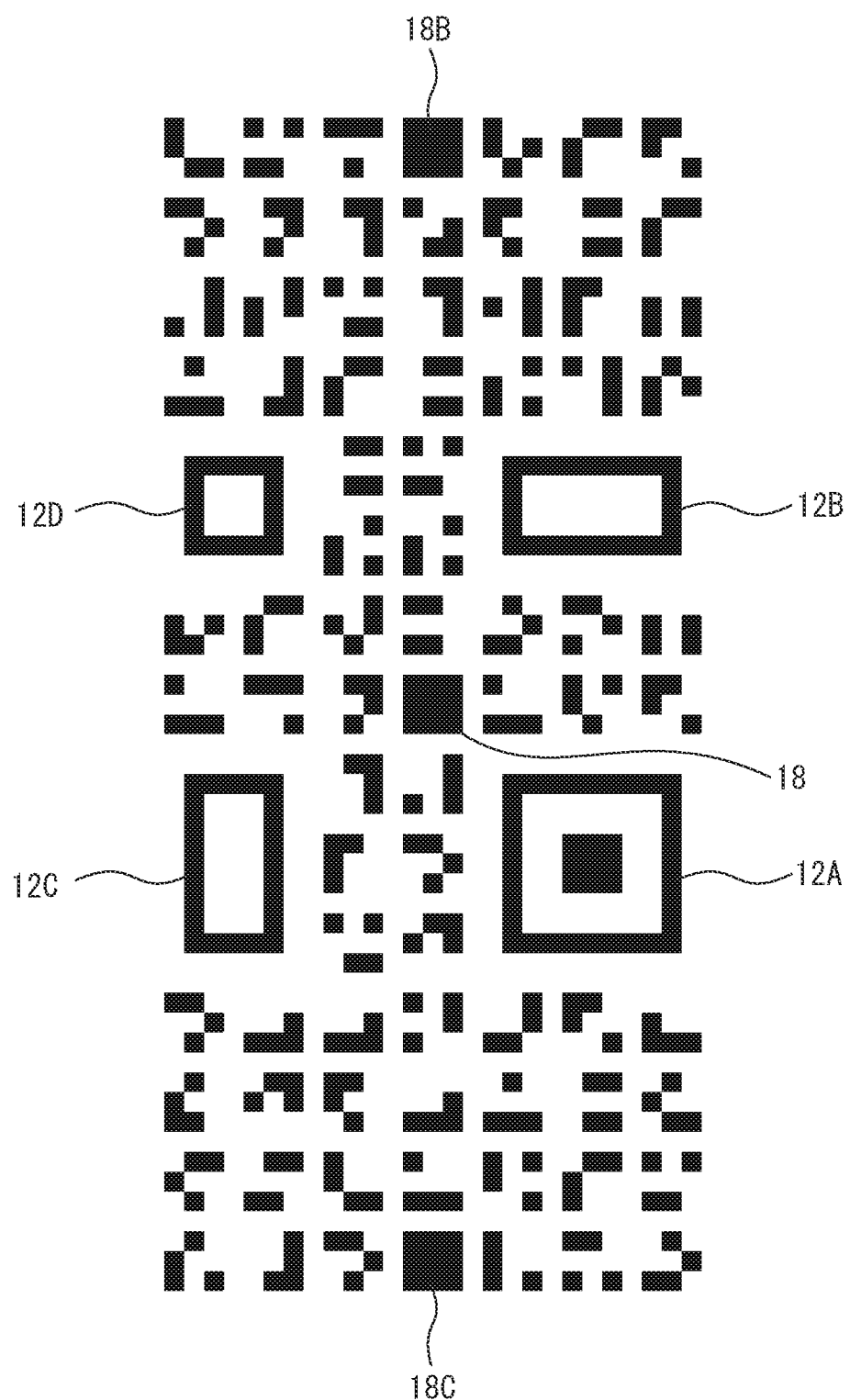
FIG. 13 illustrates another example of the second embodiment.

FIGS. 12 and 13 each illustrate an example of the second embodiment.

The specification data may contain basic pattern section displacement information. When a peripheral section is sequentially added in the vertical and lateral directions outside the basic pattern section based on the version information, the basic pattern section is often positioned at substantially the center of the two-dimensional code. However, there are also cases where it is desirable to arrange the basic pattern section at an arbitrary position other than the center of the two-dimensional code. The basic pattern section displacement amount information specifies the amount of the displacement of the basic pattern section in the two-dimensional code from a prescribed reference position. A detailed example of the basic pattern section displacement information will be described later.

In the present example, peripheral section error correction level information in the peripheral section 20, blank information specifying the blank region in the peripheral section 20 and basic pattern section displacement information that represents information relating to the displacement of the basic pattern section 11 are included as specification information. Further, the blank information comprises a blank-embedding flag that indicates the presence or absence of a blank to be embedded and, when a blank is to be embedded, blank position information that indicates the region of the blank. The basic pattern section displacement information comprises: a basic pattern section displacement flag that indicates whether or not the basic pattern section 11 is to be displaced; and, when the basic pattern section 11 is to be displaced, the basic pattern section displacement amount information that represents the amount of the displacement from a prescribed position.

One example of the specification data, which are bit data representing the specification information, in the second embodiment will now be described. First, the lateral version information is input. The lateral version information has a value of 1 to 26 and represented by 2 to 9 bits. Next, the vertical version information is input by the same method. Then, the peripheral section error correction level information is input. The peripheral section error correction level information is represented by 2 bits and may take four peripheral section error correction levels. The peripheral section error correction level information will be described later. Subsequently, the blank-embedding flag that indicates the presence or absence of a blank region and the basic pattern section displacement flag that indicates the presence or absence of displacement of the basic pattern section from a prescribed position are input. The blank-embedding flag and the basic pattern section displacement flag are each represented by 1 bit, which is either "1" (presence) or "0" (absence). When the blank-embedding flag is "1", the blank position information that represents the positional information of the blank is added after the basic pattern section displacement flag. Thereafter, in cases where the basic pattern section displacement flag is the basic pattern section displacement amount information is added after the blank position information when the blank-embedding flag is "1" or after the basic pattern section displacement flag when the blank-embedding flag is Following these information, if the basic pattern section has a residual region where data can be stored, the actual data are further stored therein.

The types, order, data amount and flags of the specification information are not restricted to the above; however, it is required that the specification data yield the same interpretation in both the encoding and decoding processes.

The blank information is composed of a blank-embedding flag that indicates the presence or absence of a blank region and blank position information that represents the information of the blank region. The blank-embedding flag is 1-bit data having a state of "1" (presence) or "0" (absence). The blank position information exists only when the blank-embedding flag is "1", and the blank position information can be omitted when a blank region is absent. This enables to reduce the information when no blank is arranged, and the blank position information is added to the specification data only when a blank region is present. The blank-embedding flag may also represent the number of blank regions in addition to the presence or absence of a blank. For example, the blank-embedding flag may be composed of 2 bits and allowed to have a value of 0 to 3 that represents the number of blank positions. When this value is 0, no blank position information is added, whereas when the value is 3, the blank position information for the three blanks are added in series to the specification data.

The blank position information specifies the size and offset of each blank at the block level and is maintained as information that indicates the blank positions. The block coordinates are expressed as "(n,m)" with the block in the upper left corner of a blank region being the origin. When the number of lateral blocks and that of vertical blocks in the code are defined as "blW" and "blH", respectively, the maximum number of lateral blocks and that of vertical blocks in the blank region are also "blW" and "blH", respectively.

Figure 14:
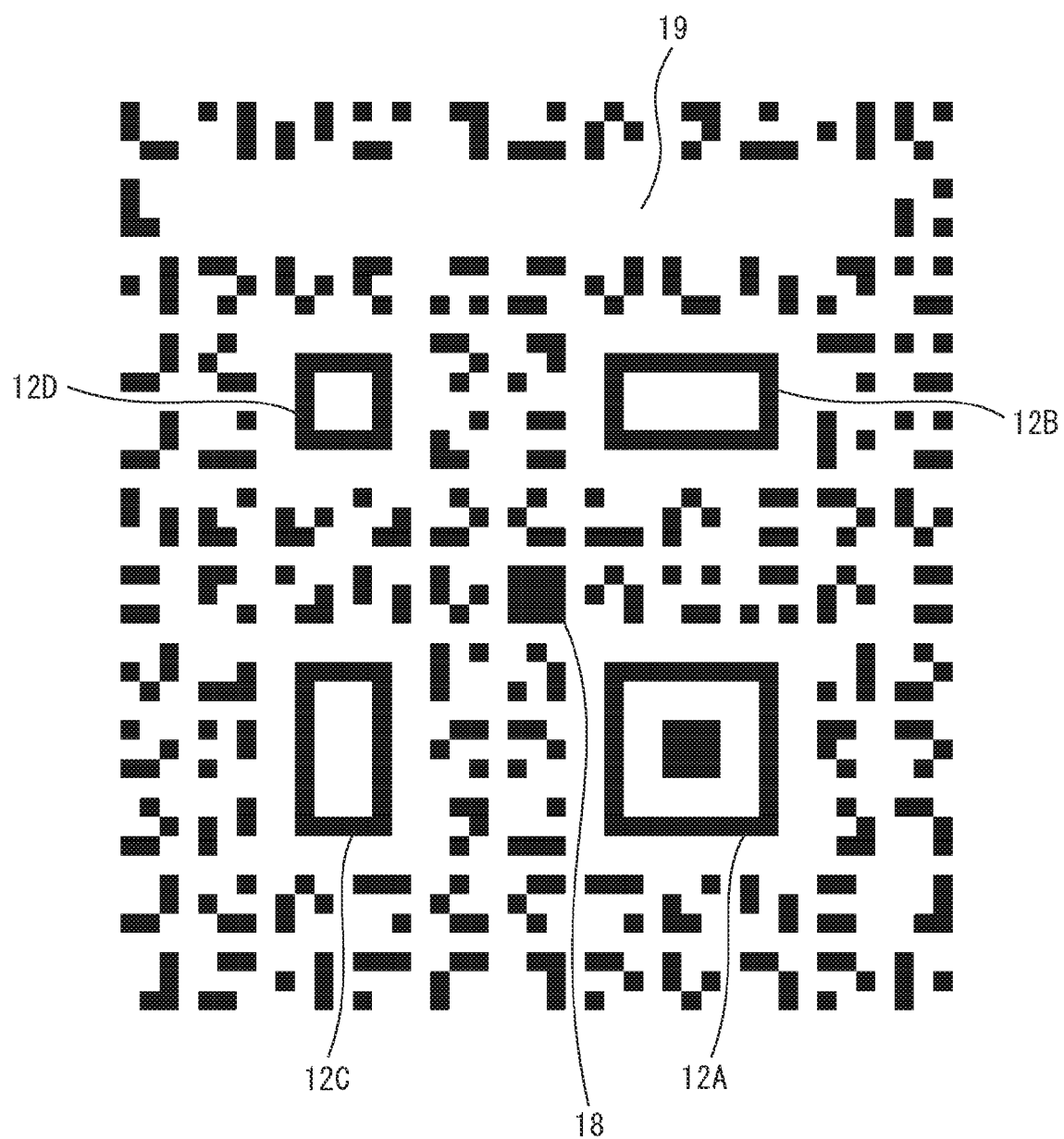
FIG. 14 illustrates an example of the two-dimensional code according to the second embodiment in which a blank region is arranged.

FIG. 14 illustrates an example of the two-dimensional code according to the second embodiment in which a blank region is arranged.

The blank region illustrated in FIG. 14 has an offset of (1,1) and is expressed to have a size of 9 lateral blocks and 1 vertical block. It is noted here, however, that the blank blocks must not overlap with the basic pattern section.

The data amount of the blank position information may vary in accordance with the size of its peripheral section.

When the version is 9 (lateral)×9 (vertical), the code has 15 lateral blocks and 15 vertical blocks. It is considered that the range of the offset that the blank region may take includes 15 coordinates in each of the vertical and lateral directions from (0,0) to (14,14). The maximum number of lateral blocks and that of vertical blocks are thus both 15. The blank position information requires a total of 16 bits, with 4 bits representing the offset in each of the vertical and lateral directions and 4 bits representing the number of blocks in each of the vertical and lateral directions.

In the same manner, when the size of the code is variable in the vertical and lateral directions and the code has a version of 11 (lateral)×11 (vertical) based on the version information, since the range of the offset that the blank region may take includes 17 coordinates in each of the vertical and lateral directions from (0,0) to (16,16), the blank position information requires a total of 20 bits, with 5 bits representing the offset in each of the vertical and lateral directions and 5 bits representing the size in each of the vertical and lateral directions.

In this manner, the amount of the required data can be increased or reduced in accordance with the number of blank regions, the range of each blank region and the size of the code.

The blank position information specifies, at the block level, the range of a region whose cells are all light cells. Since this region is not subjected to recognition, an end user can embed a design(s), a picture(s) and/or a character(s) in this region and utilize it for visualization of the code information and improvement in the design properties of the two-dimensional code. Since the contents of the blank region are ignored in the analysis, the embedded picture(s) and/or design(s) do not affect the analysis.

As a method of expressing the blank region, the following methods are considered:

(1) a method of specifying the starting coordinates, width and height of the blocks;

(2) a method of specifying the starting coordinates and end coordinates of the blocks;

(3) a method of indicating several block coordinates and specifying the inside of these coordinates to be blank;

(4) a method of specifying the blank region using cells, not blocks, as the unit;

(5) a method of reserving several blank regions and specifying them in the code; and (6) a method of modifying the scaling factor in addition to (1) to (5).

Further, when a plurality of blank regions are arranged, a different method may be employed for each region.

Figure 15:
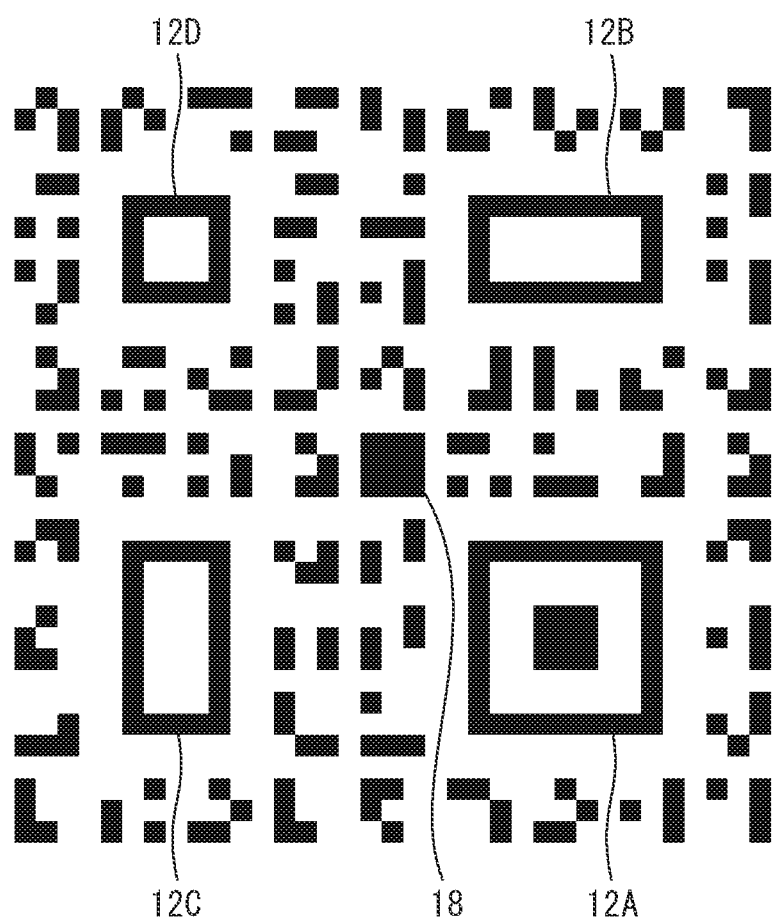
FIG. 15 illustrates an example of the two-dimensional code according to the second embodiment, which has a version of 3 (lateral)×3 (vertical) with no displacement of the basic pattern section.

FIG. 15 illustrates an example of the two-dimensional code according to the second embodiment, which has a version of 3 (lateral)×3 (vertical) with no displacement of the basic pattern section.

Figure 16:
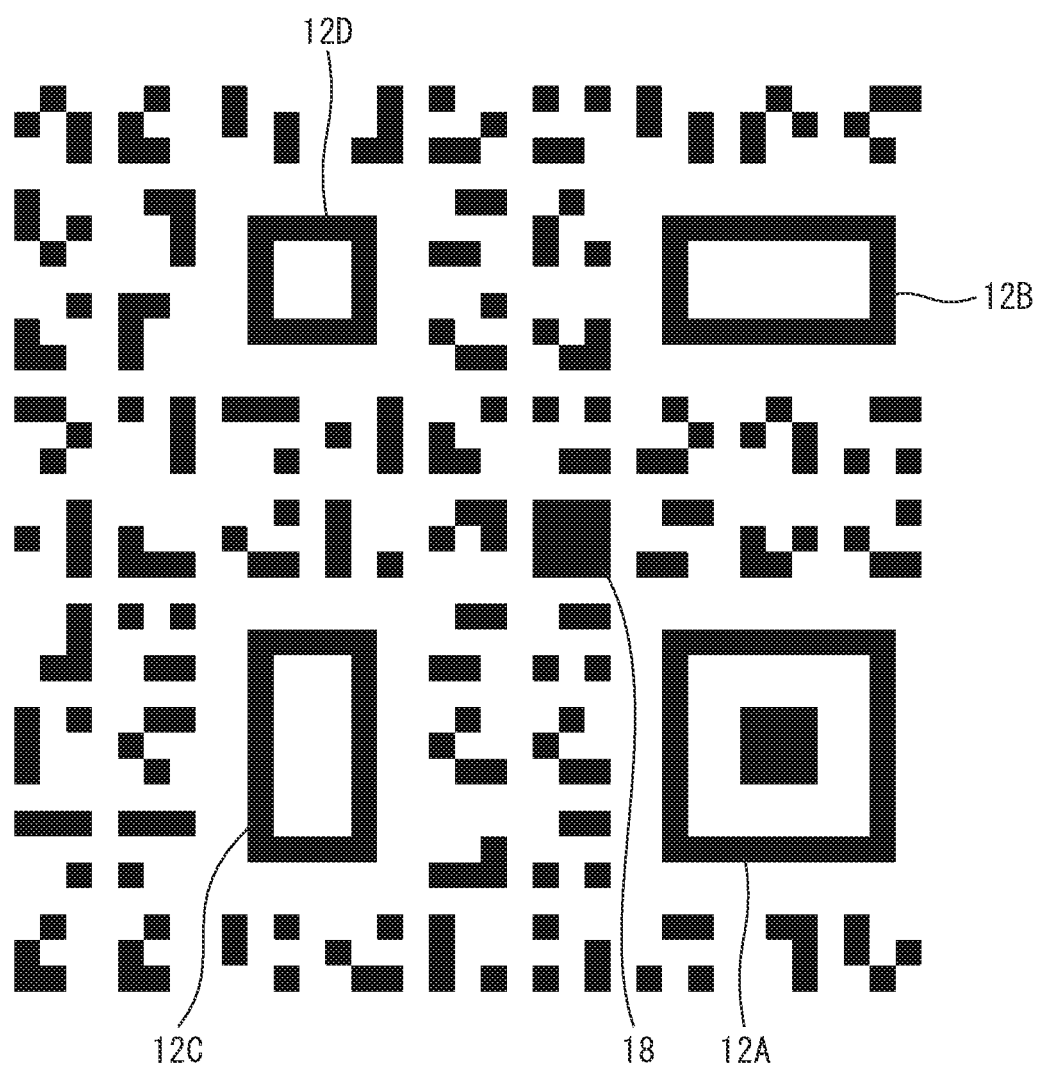
FIG. 16 illustrates an example of the two-dimensional code according to the second embodiment, in which the basic pattern section is displaced from the center with respect to the peripheral section-containing two-dimensional code.

FIG. 16 illustrates an example of the two-dimensional code according to the second embodiment, which has a version of 3 (lateral)×3 (vertical) with displacement of the basic pattern section 11 from the center with respect to the peripheral section-containing two-dimensional code 10. In FIG. 16, as compared to FIG. 15, the basic pattern section is moved toward the right by one block but not in the vertical direction. As for the basic pattern section 11, the reference position is not restricted to be the center of the region of the two-dimensional code 10. The basic pattern section displacement information indicates the arrangement of the basic pattern section 11 with respect to the region of the two-dimensional code 10, and the arrangement is determined for each of the lateral and vertical directions.

The basic pattern section displacement information is composed of a basic pattern section displacement flag, which indicates the presence or absence of displacement, and basic pattern section displacement amount information that represents the amount of the displacement of the basic pattern section from a prescribed reference position. This prescribed position in the second embodiment is the position of the basic pattern section in FIG. 9B. The basic pattern section displacement flag is 1-bit data having a state of "1" (presence of displacement) or "0" (absence of displacement). The basic pattern section displacement amount information exists only when the basic pattern section displacement flag is "1", and the basic pattern section displacement amount information can be omitted when the basic pattern section displacement flag is "0" (absent). As a result, the amount of information can be reduced when the basic pattern section is not displaced, and the basic pattern section displacement amount information is recorded as specification data only when the basic pattern section is displaced. The basic pattern section displacement amount information indicates the amount of the displacement based on the position of the basic pattern section with no displacement.

Figure 17:
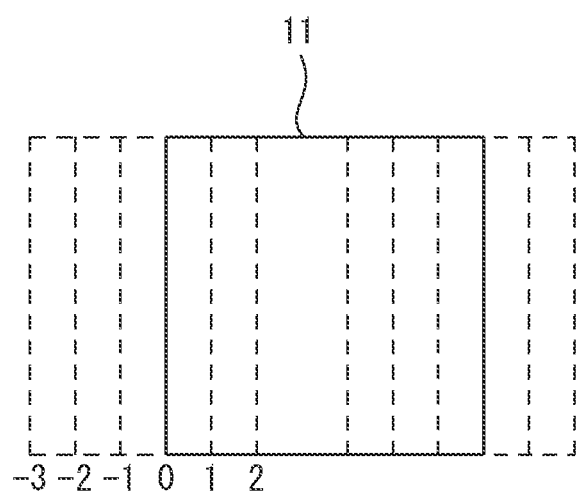
FIG. 17 is a drawing that describes how the position of the basic pattern section in the lateral direction is expressed by basic pattern section displacement amount information.

FIG. 17 is a drawing that describes how the position of the basic pattern section 11 is expressed by the basic pattern section displacement information.

As illustrated in FIG. 17, the code of version 1 consists of only the basic pattern section 11, and a block row is added on the left or right side as the version number increases. The positions to which the basic pattern section 11 can be displaced are limited by the version number. For example, when the version number is 2, the basic pattern section 11 is either not displaced or can be displaced to the left by a single block row. When the version number is 3, the basic pattern section 11 is not displaced, or can be displaced to the left or right by a single block row. In other words, an increase in the version number by 1 corresponds to an increase of a single position to which the basic pattern section 11 can be displaced. Therefore, the amount of the data required for expressing the basic pattern section displacement amount information varies depending on the version number.

In FIG. 17, when the lateral version number is 6, the numerals of −3 to 2 represent the displacement amount information of the basic pattern section 11 at a block level. In accordance with the lateral version number, "0" represents the absence of displacement; a negative value represents the basic pattern section displacement amount information toward the left side; and a positive value represents the basic pattern section displacement information toward the right side. The amount of displacement is 0 in FIG. 15 and 1 in FIG. 16. It is noted here that, since the basic pattern section is not displaced from a prescribed position in FIG. 15, the basic pattern section displacement amount information can be omitted from the specification data by assigning "0" to the basic pattern section displacement flag.

When the basic pattern section is displaced, as for the basic pattern section displacement information, the basic pattern section displacement flag is assigned with "1", and information representing the amount of lateral displacement and information representing the amount of vertical displacement are recorded in the specification data as the basic pattern section displacement amount information.

Figure 18:
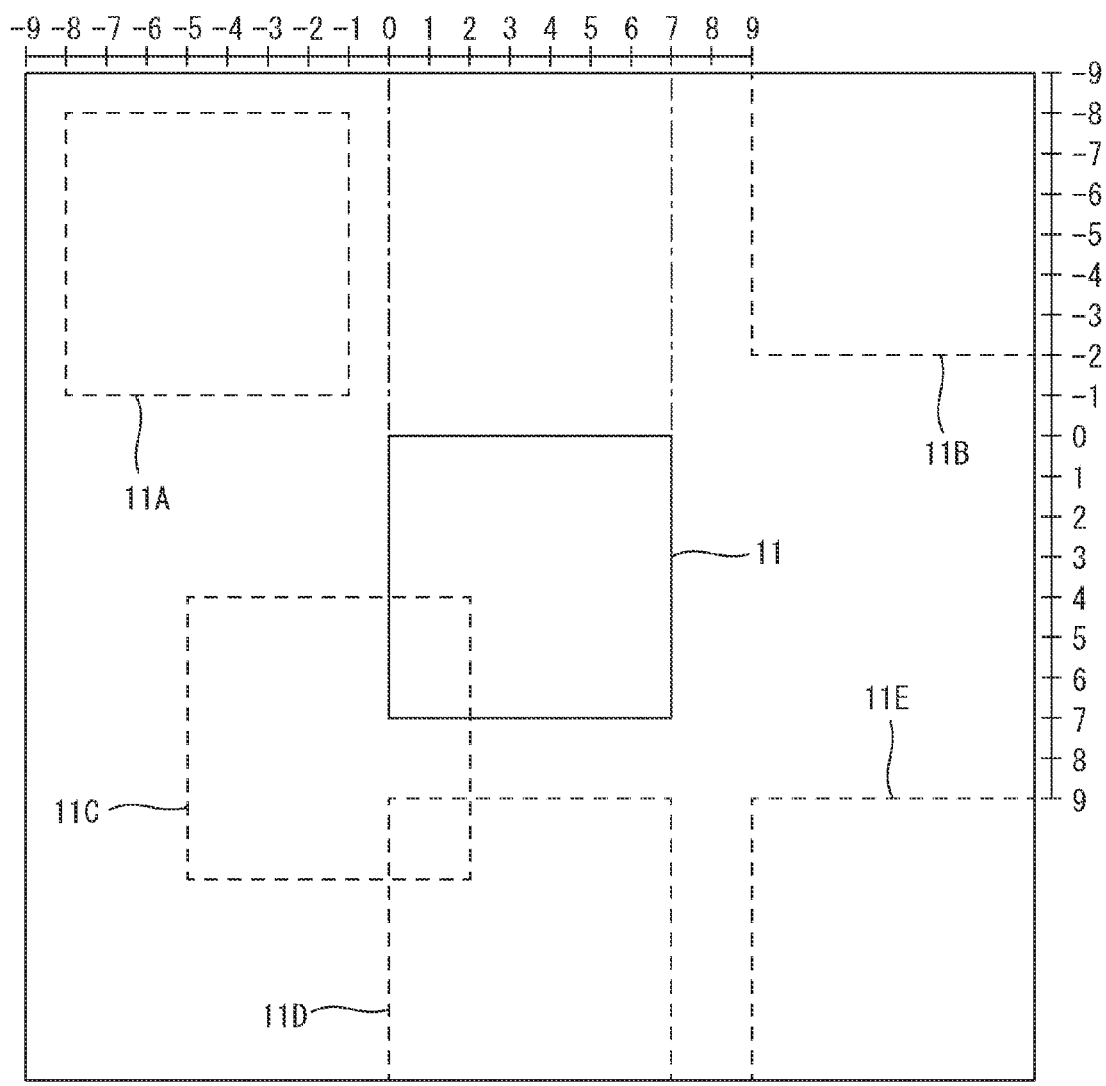
FIG. 18 illustrates cases where the basic pattern section 11 is displaced in a two-dimensional code of version 19 (lateral)×19 (vertical)

FIG. 18 illustrates cases where the basic pattern section 11 is displaced in the two-dimensional code 10 of version 19 (lateral)×19 (vertical).

In FIG. 18, the reference number 11 represents the basic pattern section 11 that is not displaced and, in this case, the position of the basic pattern section is 0 in the lateral direction and 0 in the vertical direction. The position of the basic pattern section 11 represented by the reference number 11A is −8 in the lateral direction and −8 in the vertical direction. The position of the basic pattern section 11 represented by the reference number 11B is 9 in the lateral direction and −9 in the vertical direction. The position of the basic pattern section 11 represented by the reference number 11C is −5 in the lateral direction and 4 in the vertical direction. The position of the basic pattern section 11 represented by the reference number 11D is 0 in the lateral direction and 9 in the vertical direction. The position of the basic pattern section 11 represented by the reference number 11E is 9 in the lateral direction and 9 in the vertical direction.

In the above, the displacement of the basic pattern section is represented using blocks as the unit; however, it may also be represented using cells as the unit.

Further, the unit of the displacement does not have to be 1 and may be a value of 2 or larger. In that case, in the two-dimensional code 10 of version 19 (lateral)×19 (vertical) illustrated in FIG. 18, there are 19 (lateral)×19 (vertical) combinations of displacement positions; however, by displacing the basic pattern section by a unit of 2 blocks, the number of combinations is reduced to 9 (lateral)×9 (vertical) and the amount of information in the specification data can thereby be reduced.

Moreover, the basic pattern section displacement amount information that represents the amount of the displacement from the center of the two-dimensional code is included in the above-described basic pattern section displacement information; however, basic pattern section position information that represents the position of the basic pattern section in the two-dimensional code may also be used in place of the basic pattern section displacement amount information.

The basic pattern section position information can indicate the block coordinates of the basic pattern section 11 based on a case where the upper left corner of the basic pattern section 11 is positioned at the block coordinates of (0,0) in the upper left of the code. For example, in the case of FIG. 16, since the upper left corner of the basic pattern section 11 is positioned at the block coordinates of (2,1), the data representing a displacement of 2 blocks in the lateral direction and 1 block in the vertical direction are recorded as the basic pattern section position information in the specification data.

As other method of expressing the basic pattern section position information, a method of defining the displacement pattern of the basic pattern section in advance may also be employed. For example, as the displacement pattern of the basic pattern section, four patterns of "upper left", "upper right", "lower left" and "lower right" are defined in advance and, with 2 bits being allocated to the basic pattern section position information, a value of 0 to 3 is assigned to each of the displacement patterns. In the two-dimensional code 10 of FIG. 18, when the value indicated by the basic pattern section position information corresponds to the "upper left" pattern, the basic pattern section is positioned at the block of −9 in the lateral direction and −9 in the vertical direction, while when the value corresponds to the "lower right" pattern, the basic pattern section is positioned at the block of 9 in the lateral direction and 9 in the vertical direction.

This method is advantageous in that it enables to always maintain the basic pattern section displacement amount information in 2 bits and the specification data can thereby be kept small.

Further, by defining a total of 5 patterns with addition of "center" to the above-described displacement patterns and omitting the basic pattern section displacement flag, the basic pattern section displacement information is always represented by 3 bits, so that the displacement of the basic pattern section can be realized using a small amount of information.

The specification data can be imparted with peripheral section error correction level information. This allows the amount of the error correction in the peripheral section actual data to be recorded as a peripheral section error correction level in the peripheral section error correction level information. For example, the peripheral section error correction level is selected from 4 levels of 10%, 20%, 30% and 40%. This enables to increase the error correction level for the recognition of the code used in an environment having poor photographing conditions or to lower the error correction level otherwise. In this case, 2 bits are secured for the peripheral section error correction level information in the specification data.

The peripheral section error correction level affects the amount of the peripheral section actual data in such a manner that the amount of the data is increased when the peripheral section error correction level is low, or it is reduced when the peripheral section error correction level is high.

When the code has no peripheral section (when the version is 1 (lateral)×1 (vertical)), the peripheral section error correction level information is not necessary and can thus be omitted from the specification data, so that the amount of the actual data can be increased by that much. The number of data-containing blocks in the peripheral section is determined by the version information, the blank information and the position correction patterns. As a result, the amount of data that can be recorded in the peripheral section is determined. Based on this data capacity of the peripheral section and the peripheral section error correction level information, the amount of the peripheral section actual data and that of the peripheral section error correction data are determined.

As for the data arrangement in the peripheral section, in one example of the second embodiment, for example, the peripheral section actual data are sequentially recorded in each block in the direction from the upper left to the right and, once the recording is completed for one row, the remaining peripheral section actual data are sequentially recorded in each block of one row below in the left-to-right direction. After the peripheral section actual data, the peripheral section error correction data are recorded. In this process, no data is recorded in the basic pattern section, the blank region and the position correction patterns.

The above is just one example, and any method of arranging the data in the peripheral section may be employed as long as it is decided in advance.

Further, as one example of the second embodiment, style information may also be included in the specification data. In this case, the style information is capable of maintaining four states where the vertical and lateral versions are variable, only the vertical version is variable, only the lateral version is variable, or the versions are not variable (no peripheral section). This leads to a change in the amount of the data in the version information. The style information makes the amount of version information variable in such a manner that, in accordance with the content of the style information, the data of the version information maintain two values of the vertical and lateral versions when the vertical and lateral versions are variable or a single value when only the vertical version or the lateral version is variable, or the version information is omitted in other cases. The style information also permits a code form that has a high degree of freedom.

In addition to the above, as the style information, a variety of shapes such as a round shape and a star shape are also considered, and such style information enables to freely modify the shape of the code in accordance with the intended use.

The peripheral section is not required to be arranged adjacent to the basic pattern section. Thus, a variety of peripheral sections may be arranged at positions away from the basic pattern section. Accordingly, the peripheral section can assume a free shape, regardless of the shape of the basic pattern section.

Further, the peripheral section is independent of the basic pattern section. Thus, it is not required that the peripheral section and the basic pattern section have the cells of the same square shape, nor that the size of the cells be the same in the basic pattern section and the peripheral section. For example, in order to make the cells of the basic pattern section more recognizable, the basic pattern section may have larger cells than those of the peripheral section. Moreover, the amount of the data contained in each block of the peripheral section is not required to be the same as the amount of the data contained in each block of the basic pattern section. In addition, the shape of the blocks of the peripheral section may be different from that of the blocks of the basic pattern section.

As described above, in the two-dimensional codes of the first and second embodiments, since the amount of the specification data can be increased or decreased in accordance with the contents of the specification data and the actual data are recorded in the data region of the basic pattern section that remains after recording the specification data, a reduction in the data efficiency can be inhibited. In addition, since the amount of the specification data that can be recorded in the basic pattern section may be increased or decreased in accordance with the degree of freedom in selecting the external shape of each two-dimensional code, two-dimensional codes having a variety of functions can be flexibly afforded. Moreover, by allowing the amount of the specification data and the size of the peripheral section to have a proportional relationship, the amount of the specification data can be adjusted to conform to the size of each two-dimensional code. In the second embodiment, the configuration in which the peripheral section is arranged around the basic pattern section can be realized even without making the amount of the specification data variable and allowing the basic pattern section to contain the actual data. Further, when plural position detection patterns are used in the second embodiment, since the distances between the plural position detection patterns are constant, an excellent effect of recognizing and processing plural codes at once can be attained in the same manner as in the first embodiment.

It is preferred that the position detection patterns used in the first and second embodiments comprise: a first position detection pattern 12A in the form of having a square frame with a square arranged therein; a second position detection pattern 12D in the form of a square frame that is smaller than the first position detection pattern 12A; and rectangular third and fourth position detection patterns 12B and 12C. These four position detection patterns 12A to 12D are each arranged at four corners of the basic pattern section 11. In this case, it is desired that: the first position detection pattern 12A and the second position detection pattern 12D be arranged at opposite diagonal corners; the third position detection pattern 12B and the fourth position detection pattern 12C be arranged at opposite diagonal corners; the long side of the third position detection pattern 12B and that of the fourth position detection pattern 12C have the same length as the side of the first position detection pattern 12A; the short side of the third position detection pattern 12B and that of the fourth position detection pattern 12C have the same length as the side of the second position detection pattern 12D; one of the short sides of the third position detection pattern 12B and that of the fourth position detection pattern 12C be arranged on the extension of a side of the first position detection pattern 12A; and one of the long sides of the third position detection pattern 12B and that of the fourth position detection pattern 12C be arranged on the extension of a side of the second position detection pattern 12D. The position detection patterns 12A to 12D illustrated in FIG. 1 are easily recognizable independent of each other and, even when some of the position detection patterns are not recognizable due to contamination or the like, the coordinate positions of the cells in the two-dimensional code can be easily determined from a combination of other recognizable position detection patterns.

For the position detection patterns, a variety of modification examples can be adopted in addition to the examples described in the first and second embodiments. For example, the number of the position detection patterns is 1 or greater with no upper limit; however, realistically, the maximum number of the position detection patterns is 4 or so, and a greater number of the position detection patterns do not have much effect and rather impair the data efficiency. Further, there may be cases where the plural position detection patterns have the same form and cases where some of the plural position detection patterns have different forms. Moreover, in the basic pattern section 11, the positions of the position detection patterns are not restricted to the corners, and one position detection pattern or some or all of the plural position detection patterns may be arranged at positions other than the corners. In other words, in the basic pattern section 11, the positional relationships between the position detection patterns and the data region 13 can be arbitrarily decided.

As representative examples other than those described as the first and second embodiments, for example, a combination of three position detection patterns of different forms and one position correction pattern, a combination having a total of 4 or more position detection patterns and position correction patterns, and a combination of one position detection pattern and one position correction pattern are considered. In the case of a combination of three position detection patterns of different forms and one position correction pattern, the coordinate positions of the cells in the two-dimensional code can be relatively easily determined.

Next, the process of generating the two-dimensional codes of the above-described embodiments (encoding process) will be described.

Figure 19:
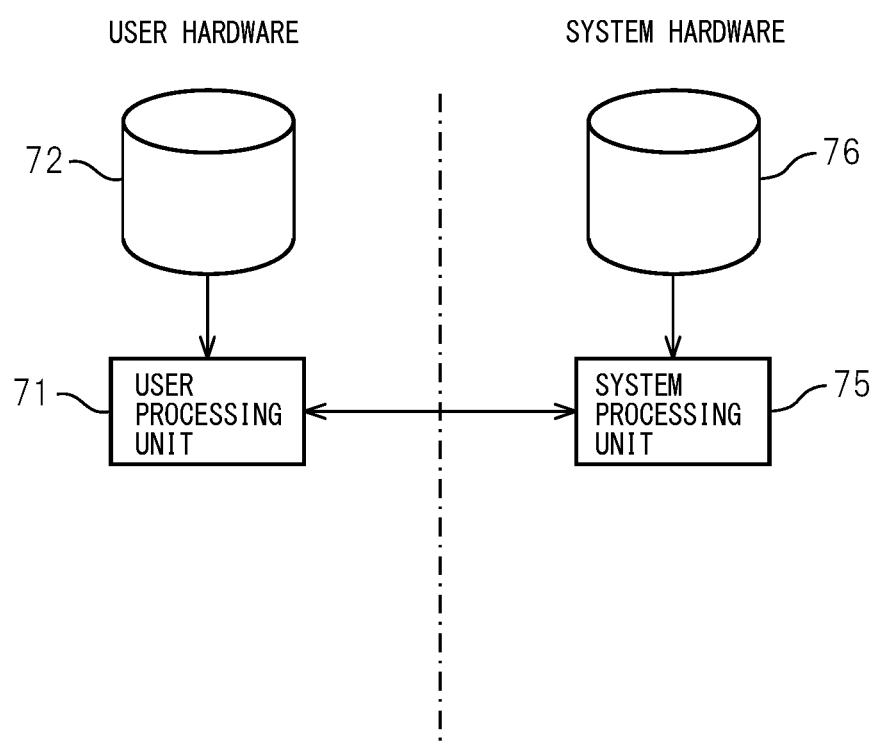
FIG. 19 illustrates a hardware configuration of a system for generating and providing a two-dimensional code.

FIG. 19 illustrates an example of a client-server configuration, which is a hardware configuration of a system for generating and providing a two-dimensional code.

The generation system comprises: a user hardware which is operated by a user who determines the specifications and requests a two-dimensional code to be generated; and a system hardware which generates and provides the requested two-dimensional code.

The user hardware comprises: a user processing unit 71, such as a computer; and a memory device 72, such as a magnetic disk.

The system hardware comprises: a system processing unit 75, such as a computer; and a memory device 76, such as a magnetic disk.

The user processing unit 71 and the system processing unit 75 are configured to allow communication therebetween, being connected through a communication line or the like.

Printing is performed on the user side; however, it may also be performed on the system side or at other printing place. The resulting two-dimensional code may be printed on any medium such as a sheet of paper, a resin plate or a casing surface. A design to be embedded may be printed on the medium in advance, and the two-dimensional code is printed after setting the medium such that the printed design to be embedded is fitted into the design region of the two-dimensional code.

Any printing apparatus can be employed as long as it is capable of printing a two-dimensional code on the above-mentioned media, and the printing apparatus may be, for example, a simple printer, a precision printers, or other printing apparatus capable of performing not only mono-chrome printing but also color printing. The generated two-dimensional code may also be transmitted to the user as two-dimensional code data through a communication line, without being printed. The user, as required, then transmits the data to a third party display or the like so that the generated two-dimensional code is displayed.

FIG. 19 illustrates an example of a generation system having a client-server configuration; however, the generation system is not restricted thereto. A variety of modifications can be made and the generation system may take, for example, a configuration in which a two-dimensional code is issued by an encoding software on a client's PC and then printed by a USB-connected printer or a configuration in which a two-dimensional code is issued from a hand-held terminal or printer. Further, the two-dimensional code generation process may be recorded on a computer-readable non-transitory recording medium as a program that can be executed by a computer.

Figure 20:
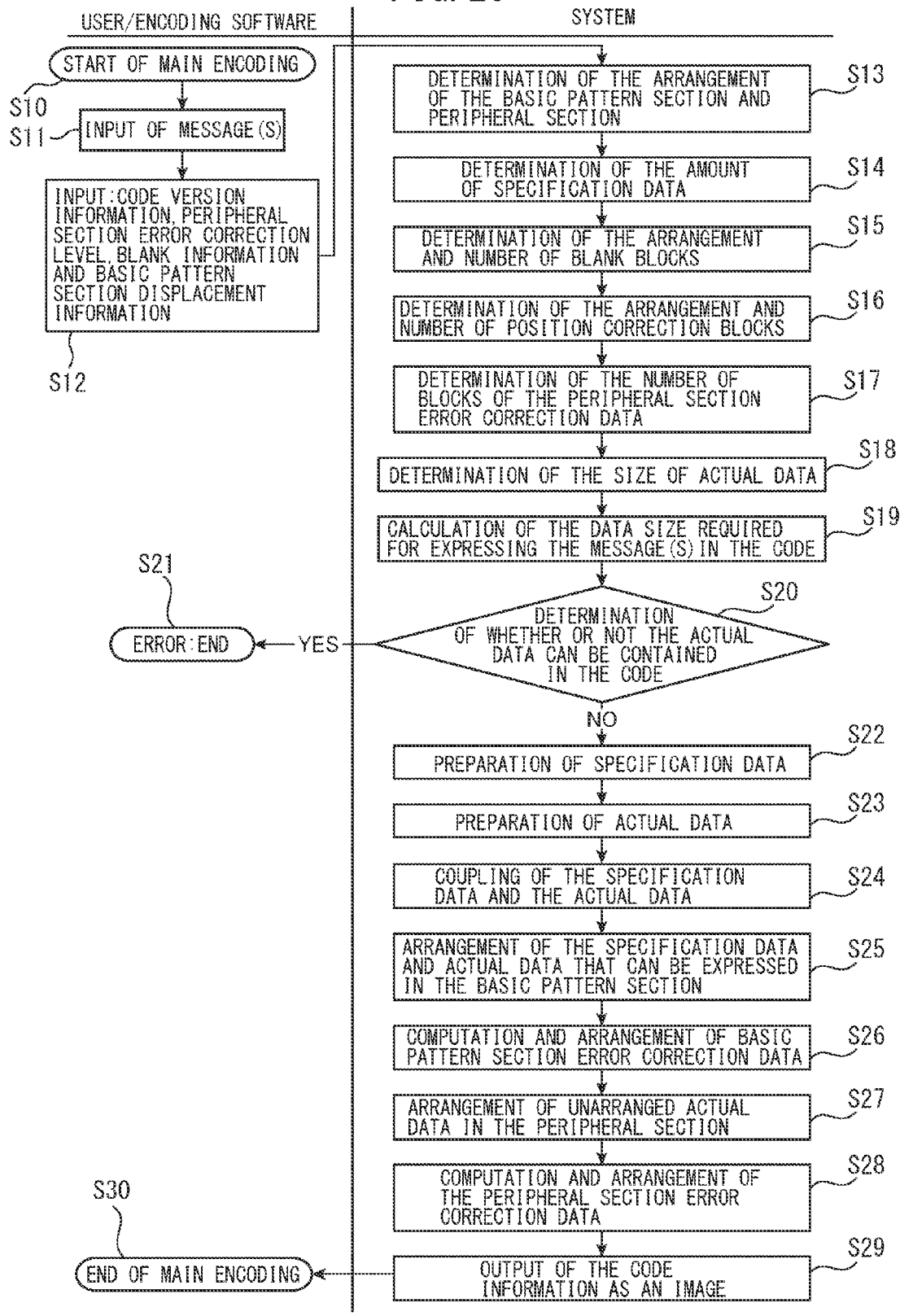
FIG. 20 is a flow chart illustrating the procedures of the encoding process in which a user accesses the system hardware via the user hardware and generates a desired two-dimensional code.

FIG. 20 is a flow chart illustrating the procedures of the encoding process in which a user accesses the system hardware via the user hardware and generates a desired two-dimensional code. This flow chart illustrates a case of generating a two-dimensional code of a version higher than the version 1 (lateral)×1 (vertical) and, since the version 1 (lateral)×1 (vertical) includes no peripheral section, the processes associated therewith are practically omitted.

In the step S10, the user initiates the main encoding process.

In the step S11, the user inputs a message(s) to be recorded in a two-dimensional code.

In the step S12, the user inputs the version information, peripheral section error correction level, blank information and basic pattern section displacement information of the two-dimensional code. In response to this, the user processing unit 71 notifies the system processing unit 75 of the input message(s), version information, peripheral section error correction level, blank information and basic pattern section displacement information.

In the step S13, on the system side, the arrangement of the basic pattern section and the peripheral section is determined based on the transmitted information.

In the step S14, the amount of the specification data is determined based on the transmitted information.

In the step S15, on the system side, the arrangement and number of blank region blocks are determined based on the transmitted information.

In the step S16, the arrangement and number of position correction pattern blocks are determined.

In the step S17, from the peripheral section error correction level, the number of blocks of the peripheral section error correction data is determined.

In the step S18, the size of actual data that can be recorded in the two-dimensional code is determined.

In the step S19, the size of the actual data required for expression of the message(s) in the two-dimensional code is calculated.

In the step S20, it is assessed whether the actual data calculated in S19 can be contained in the data size of the two-dimensional code determined in S18 or the actual data calculated in S19 cannot be contained due to insufficient data size. When the data size is insufficient, the insufficiency of the data size is transmitted to the user processing unit 71, or when the data size is sufficient, the operation proceeds to the step S22.

In the step S21, the user processing unit 71 notifies the user of the occurrence of an error that the two-dimensional code of the input form does not have a sufficient data size for expressing the input message(s), and the operation is terminated.

In the step S22, the specification data are prepared.

In the step S23, the actual data are prepared.

In the step S24, the specification data and the actual data are combined.

In the step S25, the specification data and actual data that can be recorded in the basic pattern section are arranged in the basic pattern section.

In the step S26, based on the thus recorded data in the basic pattern section, the basic pattern section error correction data are computed and arranged.

In the step S27, the actual data that could not be stored in the basic pattern section are arranged as peripheral section actual data in the peripheral section.

In the step S28, based on the peripheral section actual data, the peripheral section error correction data are computed and arranged.

In the step S29, the information of the two-dimensional code is output to the user processing unit 71 as an image.

In the step S30, the main encoding process is completed.

Figure 21:
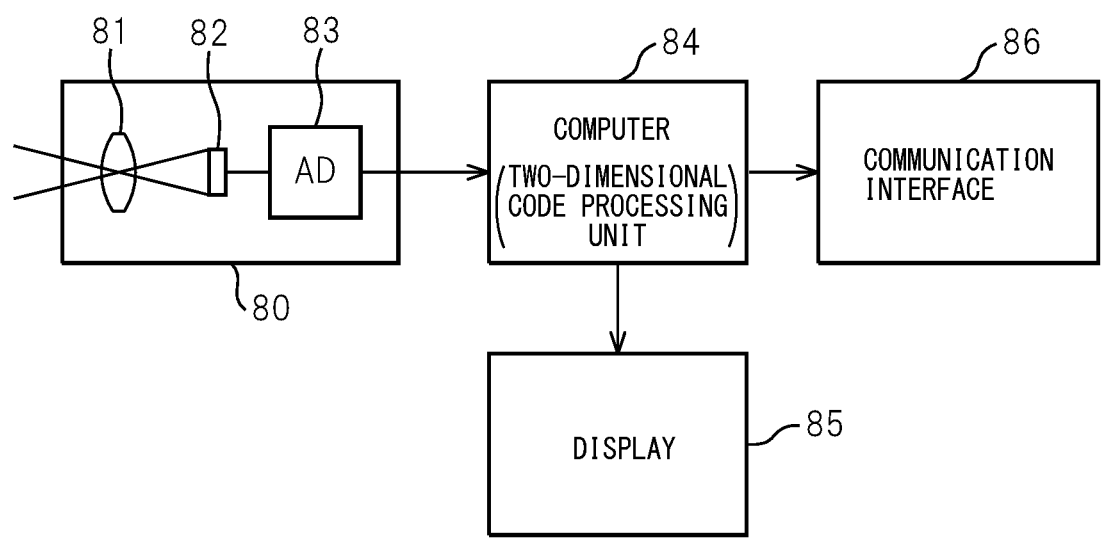
FIG. 21 illustrates the hardware configuration of a two-dimensional code analyzer which reads and analyzes the two-dimensional codes of the below-described embodiment.

FIG. 21 illustrates a hardware configuration of a two-dimensional code analyzer which reads and analyzes the two-dimensional code of the second embodiment.

The two-dimensional code analyzer comprises: a reading unit 80; a computer (two-dimensional code analysis/processing unit) 84; a display 85; and a communication interface 86. The reading unit 80 comprises: a lens 81; an image sensor 82; and an analog-digital converter (AD) 83, and outputs digital image data of a photographed two-dimensional code to the computer 84. Such a two-dimensional code analyzer as illustrated in FIG. 21 is widely used and, in recent years, portable terminals have also realized the same functions as the two-dimensional code analyzer. Further, the two-dimensional code analysis process may be recorded on a computer-readable non-transitory recording medium as a program that can be executed by a computer.

Figure 22:
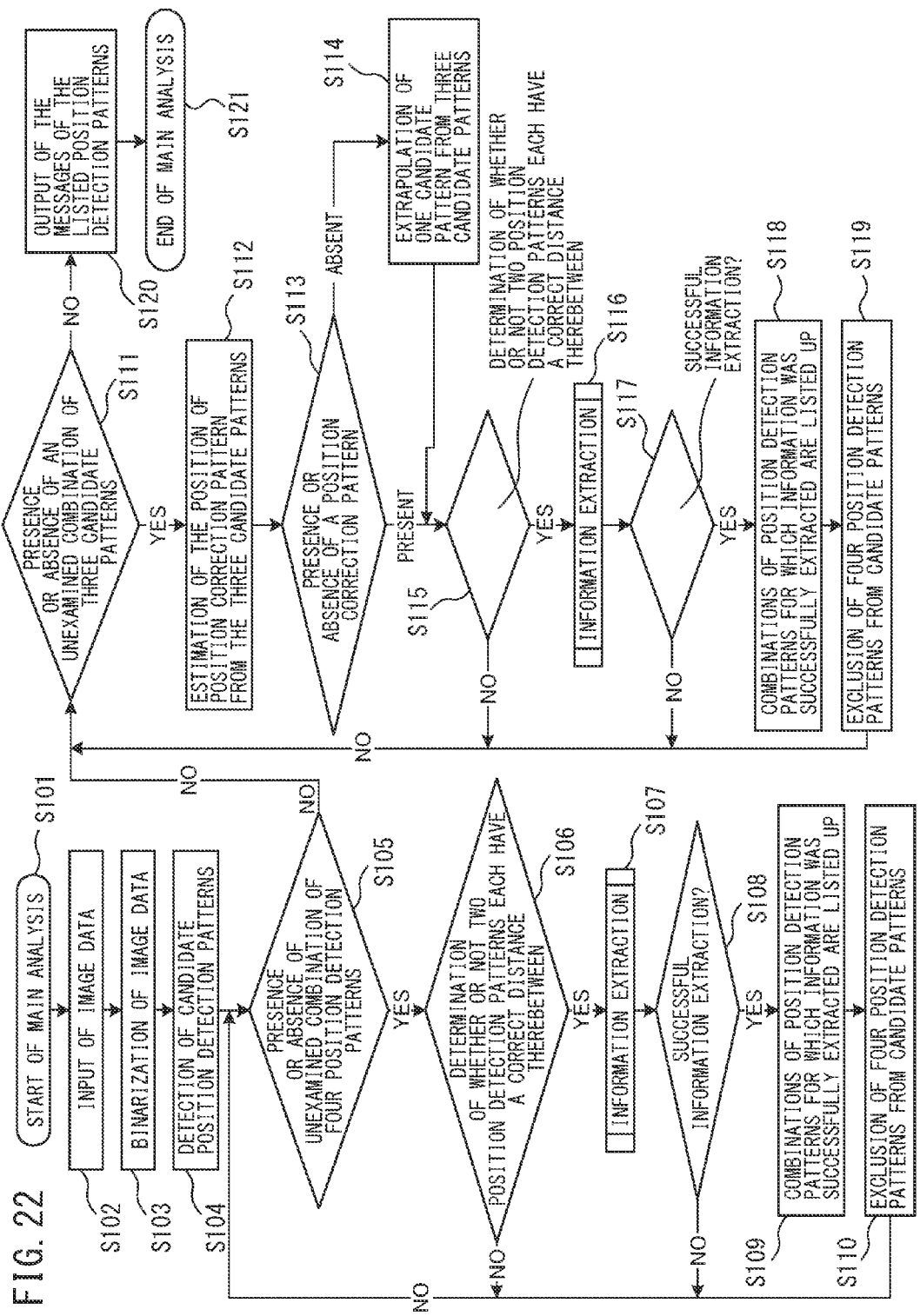
FIG. 22 is a flow chart illustrating the procedures of the decoding process in which a two-dimensional code photographed by a user is analyzed.
Figure 23:
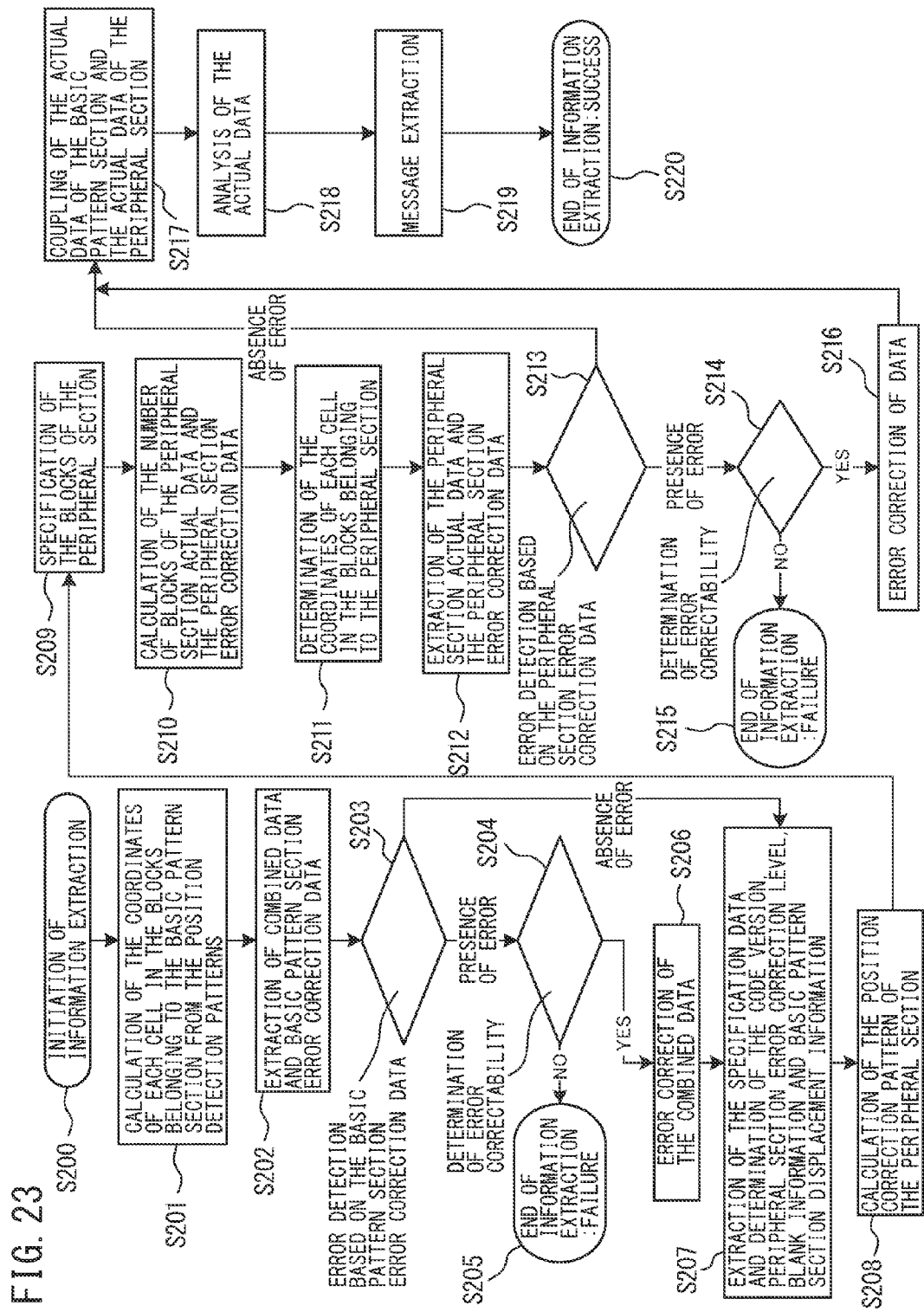
FIG. 23 is a flow chart illustrating the procedures of the decoding process in which a two-dimensional code photographed by a user is analyzed.

FIGS. 22 and 23 are flow charts illustrating the procedures of the decoding process in which a two-dimensional code photographed by a user is analyzed. This decoding process assumes a case where plural two-dimensional codes of the second embodiment are projected on a single screen. The decoding process consists of a main analysis process and an information extraction process. First, the main analysis process will be described.

In the step S101, the main analysis process is initiated.

In the step S102, a photographed image of the two-dimensional codes is input.

In the step S103, a binary image of the input photographed image is generated. As for the binarization method, when the input photographed image is a color image such as an RGB image, it is once converted into a gray-scale image. An average of the maximum and minimum brightness values in the image is taken as a threshold value, and those pixels with a value of not less than the threshold value are defined to be "light" and those pixels with a value of less than the threshold value are defined to be "dark". The gray-scale conversion of a color image is carried out using the RGB values of the respective pixels in accordance with a conversion formula: Brightness=$0.299R+0.587G+0.114B$. The conversion method is not restricted to the above-described one as there have been proposed a variety of methods for conversion of a color image into a gray-scale image as well as for further conversion of the gray-scale image into a binary image.

In the step S104, candidate position detection patterns are detected. Specifically, when the binarized image is scanned, those patterns in which a sequence of dark-light-dark pixels or dark-light-dark-light-dark pixels appears at a certain ratio are detected in the lateral and vertical directions of the scanning.

In the step S105, combinations of four position detection patterns are generated, and it is assessed whether or not there is any combination of four position detection patterns that has not be examined. If any, the operation proceeds to the step S106 and, if not, the operation proceeds to the step S110.

In the step S106, when there is even one combination in which any two position detection patterns have an inappropriate distance therebetween, this combination can be assessed as an incorrect combination. In this manner, false detection is eliminated based on the distances between the position detection patterns.

In the step S107, information is extracted for those combinations of position detection patterns that are assessed to be of the same two-dimensional code. This process will be described later referring to FIG. 23.

In the step S108, in accordance with the result of the information extraction, the operation proceeds to the step S109 when the extraction was successful, while when the extraction failed, the combinations of position detection patterns for which the extraction failed are excluded and the operation returns back to the step S105.

In the step S109, the combinations of position detection patterns for which information was successfully extracted are listed up.

In the step S110, the four candidate position detection patterns used in the two-dimensional pattern from which data were successfully extracted are excluded, and the operation returns back to the step S105. When an unused candidate position detection pattern exists in the range of the two-dimensional pattern from which data were successfully extracted, such a position detection pattern is also excluded from the candidates.

By repeating the steps S105 to S110, the assessment of whether or not each combination of four candidate position detection patterns in the projected two-dimensional codes belongs to the same two-dimensional code is completed.

In the step S111, it is assessed whether or not there is any combination of three candidate position detection patterns that has not be examined. If not, the operation proceeds to the step S120 and, if any, the operation proceeds to the step S112.

In the step S112, from the three candidate position detection patterns, the position of position correction pattern is estimated.

In the step S113, the presence or absence of a position correction pattern is assessed. If present, the operation proceeds to the step S115 and, if absent, the operation proceeds to the step S114.

In the step S114, from the three candidate position detection patterns, one candidate position detection pattern is extrapolated, and the operation then proceeds to the step S115.

In the step S115, when there is even one combination in which the distance between two position detection patterns is not appropriate, such a combination can be assessed as an incorrect combination. When extrapolation was performed using the position correction patterns and the like as well, the coordinates of the position detection pattern expected to be missing are estimated, and the distances are examined.

In the step S116, information is extracted for those combinations of position detection patterns that are assessed to be of the same two-dimensional code. This process will be described later referring to FIG. 23.

In the step S117, in accordance with the result of the information extraction, the operation proceeds to the step S118 when the extraction was successful, while when the extraction failed, those combinations of position detection patterns for which the extraction failed are excluded and the operation returns back to the step S111.

In the step S118, the combinations of position detection patterns for which information was successfully extracted are listed up.

In the step S119, the three candidate position detection patterns used in the two-dimensional pattern from which data were successfully extracted are excluded, and the operation returns back to the step S111. When an unused candidate position detection pattern exists in the range of the two-dimensional pattern from which data were successfully extracted, such a position detection pattern is also excluded from the candidates.

By repeating the steps S111 to S119, the assessment of whether or not each combination of three candidate position detection patterns in the projected two-dimensional codes belongs to the same two-dimensional code is completed.

In the step S120, the messages of the position detection patterns that were listed up are output, and the operation proceeds to the step S121.

In the step S121, the main analysis process is completed.

Next, the information extraction process of the steps S107 and S116 will be described referring to FIG. 23.

In the step S200, the information extraction process is initiated.

In the step S201, from the position detection patterns, the coordinates of the cells in the blocks belonging to the basic pattern section are calculated.

In the step S202, the combined data and the basic pattern section error correction data are extracted.

In the step S203, error detection is performed based on the basic pattern section error correction data and, the operation proceeds to the step S204 when there is an error, or the operation proceeds to the step S207 when there is no error.

In the step S204, it is determined whether or not the error is correctable based on the cell data in the blocks. When the error is not correctable, the operation proceeds to the step S205, while when the error is correctable, the operation proceeds to the step S206.

In the step S205, the failure of the information extraction from the two-dimensional code is notified, and the operation is terminated.

In the step S206, error correction of the combined data is performed.

In the step S207, the specification data are extracted from the combined data, and the version, peripheral section error correction level, blank information and basic pattern section displacement information of the two-dimensional code are specified.

In the step S208, based on the specification data, the position correction pattern of the peripheral section of the basic pattern section is calculated.

In the step S209, based on the specification data, the blocks of the peripheral section actual data, from which the position correction pattern and blank region of the peripheral section are excluded, and the blocks of the peripheral section error correction data are specified.

In the step S210, the total number of blocks of the peripheral section actual data and the peripheral section error correction data is calculated and, from the thus calculated value and the peripheral section error correction level, the number of blocks of the respective data is calculated.

In the step S211, the coordinates of the cells in the blocks belonging to the peripheral section are determined.

In the step S212, the peripheral section actual data and the peripheral section error correction data are extracted.

In the step S213, error detection is performed based on the peripheral section error correction data and, the operation proceeds to the step S214 when there is an error, or the operation proceeds to the step S217 when there is no error.

In the step S214, it is determined whether or not the error is correctable. When the error is not correctable, the operation proceeds to the step S215, while when the error is correctable, the operation proceeds to the step S216.

In the step S215, the failure of the information extraction from the two-dimensional code is notified, and the operation is terminated.

In the step S216, error correction of the data is performed.

In the step S217, the actual data of the basic pattern section, from which the specification data are excluded, and the actual data of the peripheral section are coupled together.

In the step S218, the actual data are analyzed.

In the step S219, the message(s) is/are extracted.

In the step S220, since the information was successfully extracted from the two-dimensional code, the operation is completed with display of the message(s).

As described above, in the two-dimensional code of the present invention, by displacing the basic pattern section comprising position detection patterns to an arbitrary position in the two-dimensional code, the position detection patterns can be moved to those spots where contamination and the like are not likely to occur. For example, this makes it possible not to arrange the position detection patterns at those spots where bending occurs, such as those parts that are likely to be wrinkled by folding or touched by a person and saddle-stitched parts of books. Accordingly, those cases where the position detection patterns cannot be found and recognized are reduced and, as a result, the recognition accuracy is improved.

In order to realize the function of displacing position detection patterns in a two-dimensional code by arranging a peripheral section outside the basic pattern section comprising the position detection patterns and moving the basic pattern section within a region of the two-dimensional code comprising the peripheral section, the amount of the specification data is increased. Therefore, in the two-dimensional code of the present invention, by allowing the amount of the specification data recorded in the basic pattern section to be variable in accordance with the specifications and recording the actual data in the basic pattern section if there is any residual space therein, a reduction in the data efficiency that occurs when the amount of the specification data is inhibited. The function itself of arranging a peripheral section outside the basic pattern section and moving the basic pattern section within a region of the two-dimensional code comprising the peripheral section is not restricted to such a data structure and can also be realized in the data structure of a conventional two-dimensional code.

In the above, embodiments of the present invention were described; however, the above descriptions of the embodiments are provided simply for the purpose of explaining the present invention, and it will be easily understood by those of ordinary skill in the art that various modifications can be made within the scope of claims.

DESCRIPTION OF SYMBOLS

10 Two-dimensional code
11 Basic pattern section
12A First position detection pattern
12B Third position detection pattern
12C Fourth position detection pattern
12D Second position detection pattern
13 Region
15 Block
16 Separation pattern
17 Cell
18 Position correction pattern

What is claimed is:

1. A two-dimensional code comprising cells representing binary-coded data that are arranged as a pattern in the form of a two-dimensional matrix,
wherein
the two-dimensional code comprises: a basic pattern section; and a peripheral section arranged outside the basic pattern section,
the basic pattern section comprises: position detection patterns for specifying cell positions; and basic pattern section displacement information that indicates a position of the basic pattern section in the two-dimensional code region, and
the cells are arranged in both of the the basic pattern section and the peripheral section.

2. The two-dimensional code according to claim 1, wherein the basic pattern section displacement information is basic pattern section displacement amount information that indicates the amount of displacement of the basic pattern section from a prescribed position.

3. The two-dimensional code according to claim 1, wherein the basic pattern section displacement information is basic pattern section position information that indicates the position of the basic pattern section in the two-dimensional code.

4. The two-dimensional code according to claim 1, wherein the basic pattern section displacement information comprises a basic pattern section displacement flag that indicates the presence or absence of displacement of the basic pattern section from a prescribed position.

5. The two-dimensional code according to claim 1, wherein the basic pattern section comprises light cell and dark cells.

6. A system for analyzing a two-dimensional code comprising cells representing binary-coded data that are arranged as a pattern in the form of a two-dimensional matrix,
wherein
the two-dimensional code comprises: a basic pattern section; and a peripheral section arranged outside the basic pattern section, and
the basic pattern section comprises: position detection patterns for specifying cell positions; and basic pattern section displacement information that indicates a position of the basic pattern section in the two-dimensional code region,
the system comprising:
a detection means for determining the coordinates of the basic pattern section based on the positional relationship of the position detection patterns and detecting the basic pattern section displacement information; and
an actual data analysis means for analyzing actual data composed of encoded messages,
wherein the actual data analysis means detects the actual data determined based on the result of detecting the basic pattern section displacement information.

7. A system for generating a two-dimensional code comprising cells representing binary-coded data that are arranged as a pattern in the form of a two-dimensional matrix,
wherein
the two-dimensional code comprises: a basic pattern section; and a peripheral section arranged outside the basic pattern section, and
the basic pattern section comprises: position detection patterns for specifying cell positions; and basic pattern section displacement information that indicates a position of the basic pattern section in the two-dimensional code region,
the system comprising:
a means for generating specification data for determination of the cell arrangement in the peripheral section of the two-dimensional code;
a means for generating actual data composed of encoded messages;
a means for arranging the basic pattern section displacement information; and
a means for arranging the actual data at least in the peripheral section.

* * * * *